(12) United States Patent
Gray, Jr.

(10) Patent No.: US 6,996,982 B2
(45) Date of Patent: Feb. 14, 2006

(54) METHOD AND DEVICE FOR SWITCHING HYDRAULIC FLUID SUPPLIES, SUCH AS FOR A HYDRAULIC PUMP/MOTOR

(75) Inventor: Charles L. Gray, Jr., Pinckney, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 23 days.

(21) Appl. No.: 10/731,985

(22) Filed: Dec. 9, 2003

(65) Prior Publication Data

US 2005/0120873 A1   Jun. 9, 2005

(51) Int. Cl.
*F16D 39/00*    (2006.01)

(52) U.S. Cl. .......................................... 60/493; 60/413
(58) Field of Classification Search ................. 60/493, 60/413, 414, 418; 91/436; 137/625.64, 137/596.2

See application file for complete search history.

(56) References Cited

U.S. PATENT DOCUMENTS

| | | | | |
|---|---|---|---|---|
| 2,700,873 A | | 2/1955 | Carlson | .......................... 60/53 |
| 2,809,652 A | * | 10/1957 | Caslow | .......................... 60/493 |
| 2,860,606 A | | 11/1958 | Ainsworth | ................. 121/46.5 |
| 3,394,545 A | | 7/1968 | Thompson et al. | ............ 60/52 |
| 3,457,836 A | | 7/1969 | Henderson | .................. 91/380 |
| 3,628,421 A | | 12/1971 | George | .......................... 91/358 |
| 3,628,567 A | | 12/1971 | Hofheim et al. | ........ 137/596.13 |
| 3,633,359 A | | 1/1972 | Worn | ............................ 60/19 |
| 3,881,512 A | | 5/1975 | Wilke | ..................... 137/596.13 |
| 4,031,811 A | | 6/1977 | Inaba et al. | ..................... 91/39 |
| 4,129,063 A | | 12/1978 | Ifield | ............................ 91/506 |
| 4,204,459 A | | 5/1980 | Johnson | ....................... 91/445 |
| 4,716,729 A | * | 1/1988 | Kakeya | ........................ 60/493 |
| 4,807,517 A | | 2/1989 | Daeschner | ................... 91/384 |
| 4,893,549 A | | 1/1990 | Forster | ....................... 92/12.2 |
| 4,903,727 A | | 2/1990 | Motzer | .................. 137/596.16 |
| 5,018,935 A | * | 5/1991 | Gage | ............................ 60/493 |
| 5,094,144 A | | 3/1992 | Akasaka et al. | .............. 91/486 |
| 5,138,838 A | * | 8/1992 | Crosser | ....................... 60/433 |
| 5,197,516 A | * | 3/1993 | Smietana | ............... 137/625.64 |
| 5,205,201 A | | 4/1993 | Göllner | ....................... 91/387 |

(Continued)

FOREIGN PATENT DOCUMENTS

EP         0 457 913 A1    11/1991

*Primary Examiner*—Edward K. Look
*Assistant Examiner*—Michael Leslie
(74) *Attorney, Agent, or Firm*—Seed Intellectual Property Law Group PLLC

(57) ABSTRACT

A spool valve includes a first valve port coupled to a fluid source at a first pressure range, a second valve port coupled to a fluid source at a second, lower, pressure range, and first and second output ports coupled to a hydraulic device. The valve includes a valve spool configured to selectively channel fluid from the first and second valve ports to the first and second output ports, respectively, while in a first position, from the second valve port to both the output ports while in a second position, and from the second and first valve ports to the first and second output ports respectively, while in a third position, and a check valve to permit one-way fluid passage from the second output port to the first valve port. The valve may include an anti-reverse check valve configured to prevent fluid from flowing into the valve via the first output port.

30 Claims, 17 Drawing Sheets

U.S. PATENT DOCUMENTS

| | | | |
|---|---|---|---|
| 5,211,015 A | * 5/1993 | Schroeder | 60/493 |
| 5,255,590 A | 10/1993 | Klemm | 91/516 |
| 5,495,912 A | 3/1996 | Gray, Jr. et al. | 180/165 |
| 5,791,226 A | * 8/1998 | Chung et al. | 91/436 |
| 5,887,674 A | * 3/1999 | Gray, Jr. | 180/307 |

* cited by examiner

METHOD AND DEVICE FOR SWITCHING HYDRAULIC FLUID SUPPLIES, SUCH AS FOR A HYDRAULIC PUMP/MOTOR

BACKGROUND OF THE INVENTION

1. Technical Field

This disclosure relates generally to the field of hydraulic switches and valves, especially spool valves, and in particular to valves for switching high and low pressure fluid supplies to a reversible pump/motor, such as for providing motive power to a passenger vehicle.

2. Description of the Related Art

According to current technology a bent-axis pump/motor machine includes a rotatable cylinder barrel having piston cylinders radially spaced around a common center. Each of the cylinders includes a piston having a first end positioned within the cylinder, and configured such that there is a pressure tight seal between the first end of the piston and the walls of the respective cylinder. A second end of each of the pistons engages a drive plate, which is coupled to a drive shaft of the machine.

The angle of the barrel can be adjusted with respect to the drive plate. It will be understood that, when the barrel and the drive plate occupy a common axis, the pistons in the barrel will not move within the cylinder as the barrel rotates. Accordingly, in this position the displacement volume of the machine is zero. On the other hand, when the axis of the barrel is rotated with respect to the axis of the drive plate, each of the pistons will reciprocate within its respective cylinder as the barrel rotates. Thus, the angle of the barrel relative to the drive plate dictates the displacement volume of the machine.

Fluid channels are coupled, via a valve plate, to the barrel, and thence to each of the cylinders of the barrel, as the barrel rotates over the valve plate.

The cylinders on one side of the barrel are coupled, via the valve plate, to a first machine port, while cylinders on the other side of the barrel are coupled to a second machine port. As the cylinder rotates over the valve plate, each cylinder is coupled first to the first port during the downstroke of the respective piston, and then to the second port during the upstroke of the piston.

The first and second machine ports are coupled to high- and low-pressure fluid sources, via a series of valves configured to selectively couple the high-pressure source to one machine port and the low pressure source to the other machine port, or alternatively, to reverse this arrangement. Such a machine may be employed as either a pump or a motor, as described below:

If the first machine port is coupled to a high-pressure fluid source, while the second machine port is coupled to a low-pressure fluid source or to a sump, the machine will exert torque in a first direction with a force that is directly related to a displacement volume of the machine, which is in turn dictated by the angle of the barrel with respect to the drive plate. Alternatively, if the high-pressure fluid source is coupled to the second machine port and the low-pressure fluid source is coupled to the first machine port, the machine will exert torque in the opposite direction, again with a force in direct proportion to the displacement volume of the machine. If the drive shaft is permitted to rotate in accordance with the applied torque, the machine will operate as a motor, providing rotational force to a transmission or some other output device. If the drive shaft is rotated against the torque applied by the machine, the machine will function as a pump, pumping fluid to the high-pressure fluid source.

Such a device is commonly referred to as a bent-axis pump/motor, and is well known in the industry.

Fluid coupling between the high- and low-pressure fluid sources and the first and second machine ports is commonly effected by first and second control valves, coupled to the first and second machine ports, respectively. Each control valve is configured to selectively couple the high- or low-pressure fluid source to its respective port. To operate in a first direction, or to apply torque in a first direction, a first one of the valves is configured to couple the high-pressure fluid source to the first machine port, while the second valve is configured to couple the low-pressure fluid source to the second machine port. To reverse the direction of applied torque of the machine, the configurations of the first and second valves is reversed, namely the first valve is configured to couple the low-pressure fluid source to the first port, while the second valve is configured to couple the high-pressure fluid source to the second port.

Bent-axis axis pump/motors of the type described above are commonly used in many applications, such as heavy construction equipment, farm machinery, and other industrial applications.

An example of a bent-axis pump/motor is described in detail in U.S. Pat. No. 4,893,549, issued to Franz Forester, which is incorporated herein by reference, in its entirety.

Some efforts have been put forth to employ hydraulic pump/motors such as the bent-axis pump/motor of the type described above, for wider use in vehicles, because of the advantages offered with respect to regenerative braking.

A hybrid powertrain vehicle that utilizes regenerative braking is described in U.S. Pat. No. 5,495,912, issued to Charles Gray, which is incorporated herein by reference, in its entirety.

Regenerative braking is a concept in which kinetic energy is reclaimed from a moving vehicle and stored for future use, rather than dissipated as heat, as is now the practice with friction brakes commonly used in motor vehicles. According to the concept of regenerative braking, when an operator applies a brake to slow a vehicle, the wheels of the vehicle are coupled to an energy collection device such as an electric generator or a hydraulic pump. As the brake is applied, the generator or pump draws energy from the rotating wheels and stores that energy in a storage medium. In turn, the resistance provided by the energy collection device slows the vehicle. In many respects, a hydraulic pump/motor is an ideal device for such an application, inasmuch as the device may be converted from a drive motor to a pump for braking simply by reversing the polarity of the first and second machine ports. Additionally, the braking force can be regulated by adjusting the angle of the cylinder barrel, as described above.

However, several problems have been encountered in developing such an application. First, valves of the type used to switch the pumps must have a large fluid capacity to accommodate the volume of fluid used by the pump/motor at full displacement. Such valves may require significant actuation energy, and are often subject to fluid leakage. Any fluid escaping from a high-pressure fluid circuit represents a loss of energy or fuel economy.

Second, when hydraulic pump/motors are used in passenger vehicles that are intended to travel at freeway speeds, the speed with which the machine can switch from motor to pump becomes critical, inasmuch as this represents the lag time between the moment an operator applies the brake and the moment the vehicle begins braking. This means that the switching valves must be very responsive and able to change modes quickly.

Third, there are safety issues that must be addressed with respect to a pump/motor. For example, if a vehicle operator were to apply the brake in a vehicle employing a conventional pump/motor, the polarity of the pressure circuits of the motor would be reversed, causing the motor to exert torque in opposition to the direction of rotation of the wheels of the vehicle, slowing and eventually stopping the vehicle. However, if the operator continues to apply the brake once the vehicle has stopped, the pump/motor will begin rotating in reverse, causing the vehicle to travel in reverse. A normal response on the part of an operator in such a situation would be to press harder on the brake in an effort to stop the vehicle. This would cause the angle of the pump/motor to increase, thereby accelerating the travel in reverse.

Addressing each of these issues adds complexity to the motor. As the system becomes more complex, manufacturing costs increase and the potential for failure of a component increases. With this increased potential come additional safety concerns, which must be addressed before such a device can be employed in passenger vehicles.

BRIEF SUMMARY OF THE INVENTION

According to an embodiment of the invention, a system is provided, having a hydraulic motor with first and second input ports, and configured to apply torque to an output shaft of the motor in a first direction when a fluid pressure at the first input port exceeds a fluid pressure at the second input port, and configured to apply torque to the output shaft in a second direction when the fluid pressure at the second input port exceeds the fluid pressure at the first input port. The system also includes a spool valve with first and second output ports coupled to the first and second input ports, respectively, and a high-pressure input port and a low-pressure input port. The valve is configured to selectively couple the high-pressure and low-pressure input ports to the first and second input ports of the motor, respectively, or to the second and first input ports, respectively, according to a selected position of a spool of the valve.

The system may further include a check valve positioned and configured to permit fluid flow into the hydraulic motor from the first input port, and to prevent fluid flow into the hydraulic motor from the second input port, and a mechanism for overriding the check valve.

The system may also include a check valve configured to permit fluid passage from the second input port of the motor to the high-pressure input port of the valve.

According to another embodiment of the invention, a valve is provided, including a valve body having an interior bore, a first valve port configured to be coupled to a fluid source pressurized to a first pressure range, a second valve port configured to be coupled to a fluid source pressurized to a second, lower, pressure range, an output port configured to carry fluid to a hydraulic device, and an input port configured to receive fluid from the hydraulic device. The valve also includes a valve spool, axially movable within the bore, configured to selectively channel fluid from the first and second ports to the output and input ports, respectively, while in a first position, from the second port to both the output and input ports while in a second position, and from the second and first ports to the output and input ports respectively, while in a third position, and a check valve configured to permit one-way fluid passage from the input port to the first valve port.

The valve may include an anti-reverse check valve configured to prevent fluid from flowing into the valve via the output port, and may also include a bypass mechanism configured to override the anti-reverse check valve, such that, when the mechanism is activated, fluid may flow into the valve via the output port.

According to an additional embodiment of the invention, a method of operating a hydraulic pump/motor is provided, including the step of placing a spool of a spool valve in a first position, such that a first fluid port of the pump/motor is in fluid communication with a first pressurized fluid source and a second fluid port of the pump/motor is in fluid communication with a second pressurized fluid source, and such that a torque in a first direction is applied to an output shaft of the pump/motor. The method also includes the steps of placing the spool in a second position, such that the first and second fluid ports of the pump/motor are in fluid communication with each other and with the second pressurized fluid source, and such that substantially no torque is applied to the output shaft, and placing the spool in a third position, such that the first fluid port of the pump/motor is in fluid communication with the second pressurized fluid source and the second fluid port of the pump/motor is in fluid communication with the first pressurized fluid source, and such that a torque in a second direction is applied to the output shaft of the pump/motor.

The method may also include preventing, while the spool is in the third position, the output shaft of the pump/motor from rotating in the second direction.

The method may additionally include permitting a one-way flow of fluid from the second fluid port of the pump/motor to the first pressurized fluid source, without regard to the position of the spool.

BRIEF DESCRIPTION OF THE SEVERAL VIEWS OF THE DRAWING(S)

DETAILED DESCRIPTION OF THE INVENTION

Figure 1A:
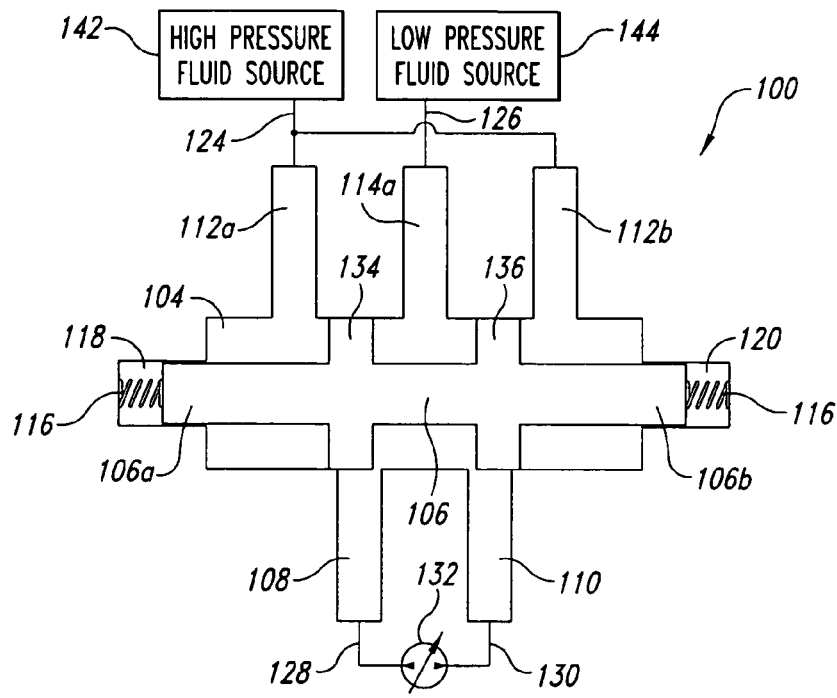
FIGS. 1A–1C illustrate a spool valve according to an embodiment of the invention.

FIG. 1 illustrates, in diagrammatical form, a spool valve 100 configured to control the operation of a reversible hydraulic device.

The spool valve 100 includes a valve bore 104 positioned longitudinally within the valve 100. The valve includes first and second high pressure inlets 112a, 112b and a low pressure inlet 114a, each in communication with the bore 104, as shown in FIG. 1.

A spool 106 is positioned within the bore 104 and configured to move longitudinally therein. The spool 106 includes lands 134 and 136 configured to direct the flow of hydraulic fluid passing through the valve 100. The spool 106 includes first and second spool stems 106a, 106b at opposing ends thereof. Pilot chambers 118 and 120 are located on opposing ends of the bore 104, and are configured to receive the spool stems 106a and 106b, respectively. A return spring 116 is positioned within each of the pilot chambers 118, 120.

The high pressure inlets 112a, 112b are coupled to a high pressure fluid source 142 via fluid lines 124. The low pressure inlet 114a is coupled to a low pressure fluid source 144 via fluid line 126. First and second drive outlets 108, 110 are each coupled to a hydraulic device 132, via hydraulic lines 128, 130, respectively.

It will be understood that the use of terms such as "inlet" and "outlet" in this description, as well as in the attached claims, are used for convenience only, and should not be interpreted, necessarily, as indicating that a passage so referenced carries fluid in one direction only. Rather, the term "inlet" is generally used with reference to passages or ports configured to be connected to pressurized fluid sources, while the term "outlet" is used, generally, to indicate passages or ports configured to transmit fluid to and from a hydraulically operated device.

The spool valve 100 is configured to selectively supply fluid from the high and low pressure sources 142, 144 to the hydraulic device 132. More particularly, when the spool 106 is centered within the bore 104, as indicated in FIG. 1A, the lands 134, 136 are positioned such that the first and second drive outlets 108, 110 are in fluid communication with each other, and with the low pressure fluid source via the low pressure inlet 114a and the low pressure line 126. With the spool 106 in this position, the hydraulic device 132 is free to move or rotate without impediment, but receives no motivating force, inasmuch as fluid is free to pass from one drive outlet, into the valve bore 104 between the lands 134, 136, and back into the other drive outlet. As the hydraulic device 132 moves or rotates, it simply circulates fluid through the valve 100. Return springs 116 in the first and second pilot chambers 118, 120 are configured to place the spool in a centered position, as shown in FIG. 1A, when pressure in the pilot chambers 118, 120 is equal. This is the default position in the event high pressure fluid is lost.

Figure 1B:
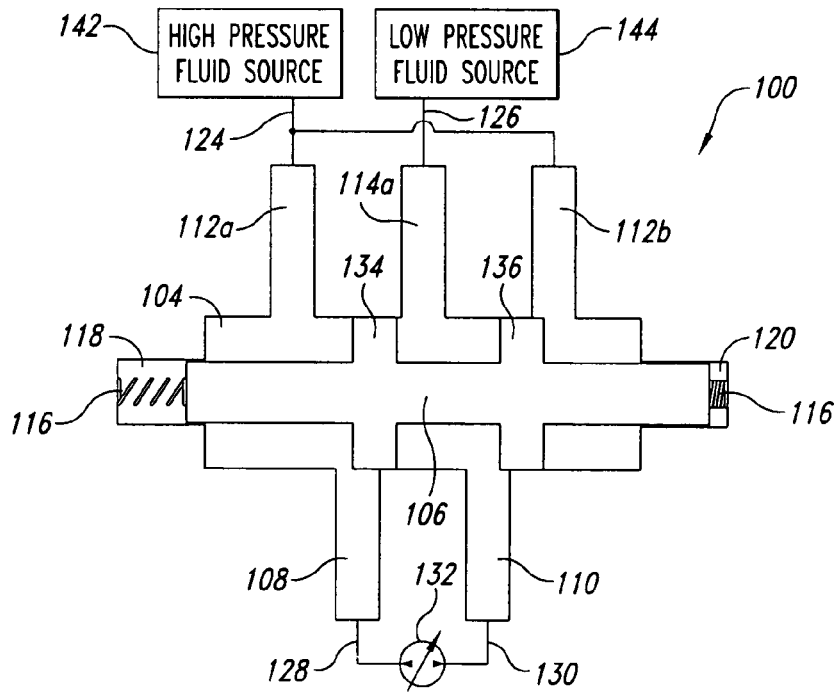

In FIG. 1B spool 106 is shown in a position to the right of center. The spool 106 occupies this position when the pressure in the first pilot chamber 118 exceeds the pressure in the second pilot chamber 120. With the spool 106 in the position shown in FIG. 1B, it may be seen that the first drive outlet 108 is in fluid communication with the high pressure fluid source 142 via the high pressure inlet 112a and the high pressure line 124, while the second drive outlet 110 is in fluid communication with the low pressure fluid source 144 via the low pressure inlet 114a and the low pressure line 126. With the spool 106 in this position, the hydraulic device 132 receives motivating force in a first direction by virtue of high pressure at the first hydraulic line 128 and low pressure at the second hydraulic line 130.

Figure 1C:
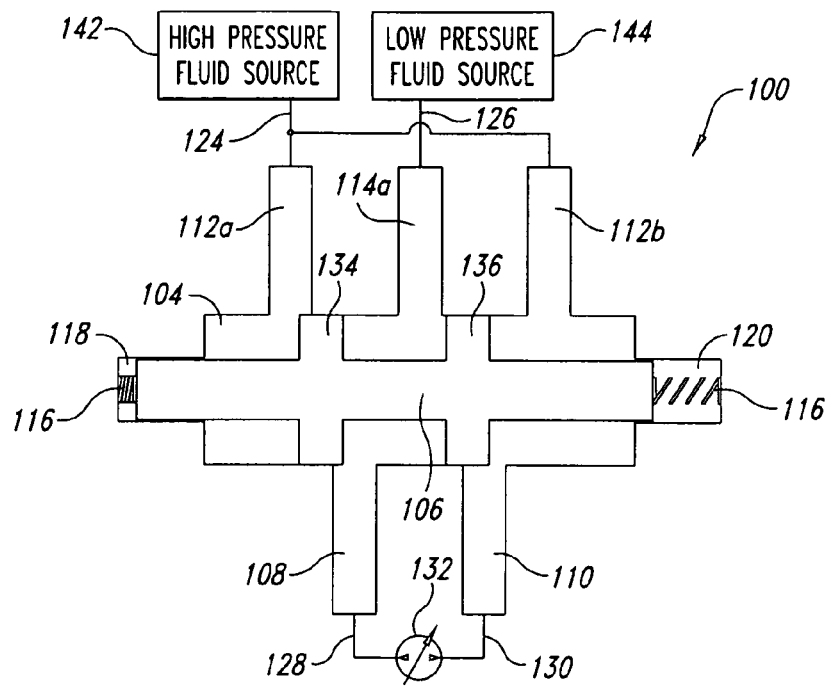

FIG. 1C illustrates a configuration of the spool valve 100 in which the spool 106 is positioned to the left of center within the bore 104. It will be noted that with the spool in the position shown in FIG. 1C, the first drive outlet 108 is in fluid communication with the low pressure fluid source 144 via the low pressure inlet 114a and the low pressure line 126, while the second drive outlet 110 is in fluid communication with the high pressure fluid source 142 via the high pressure inlet 114b and the high pressure line 124. With the valve 100 in this configuration the hydraulic device 132 receives motivating force in a second direction, opposite the first direction, by virtue of the high pressure fluid at the second hydraulic line 130 and low pressure fluid at the first hydraulic line 128.

It will be noted that the pilot chambers 118, 120 are of much smaller diameter than the bore 104 of the valve 100. The result is that the amount of fluid required to move the spool 106 within the bore 104, from a first position, such as that shown in FIG. 1A, for example to a second or third position, as shown in FIG. 1B or 1C, is much lower than it would be were the pilot chambers of a common diameter with the bore 104, as is common in known spool valves. An advantage of this feature is that the spool 106 may be made to move much more quickly than previously known spool valves. Additionally, because the return springs 116 are configured to return the spool 106 to a central position, as shown in FIG. 1A, and because the spool is configured to place the first and second drive outlets 108, 110 in fluid communication with each other when in the central position, a hydraulic system incorporating the spool valve 100 may be configured to shift to a neutral, or freewheeling mode as a safety feature, in the event of fluid pressure loss or other system failure. This is in contrast to many known systems, in which a fluid supply to a hydraulic device is shut off in a neutral position, for the purpose of locking a hydraulic device when so positioned, but which would be dangerous if done in a passenger vehicle.

Figure 2A:
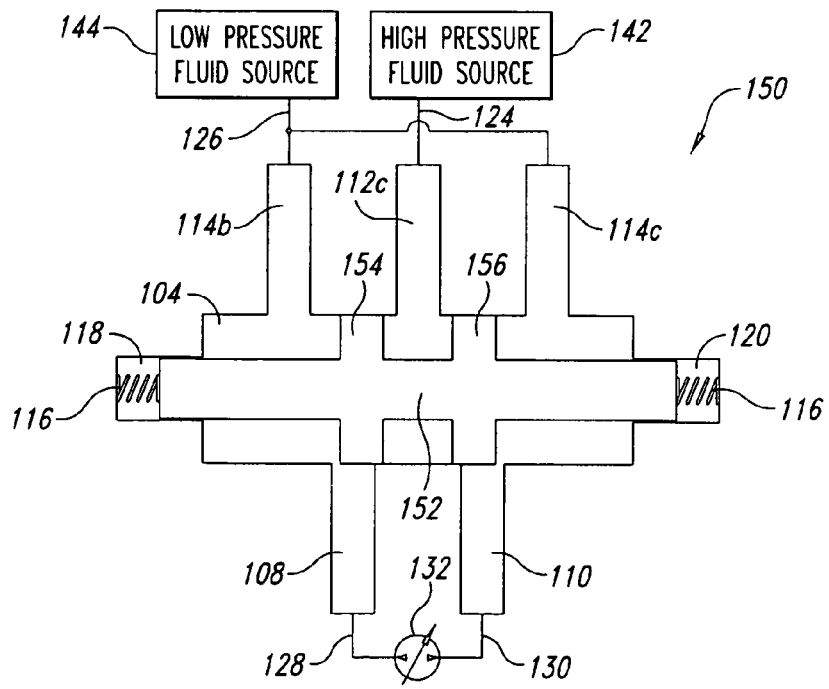
FIGS. 2A–2C illustrate a spool valve according to an embodiment of the invention.
Figure 2B:
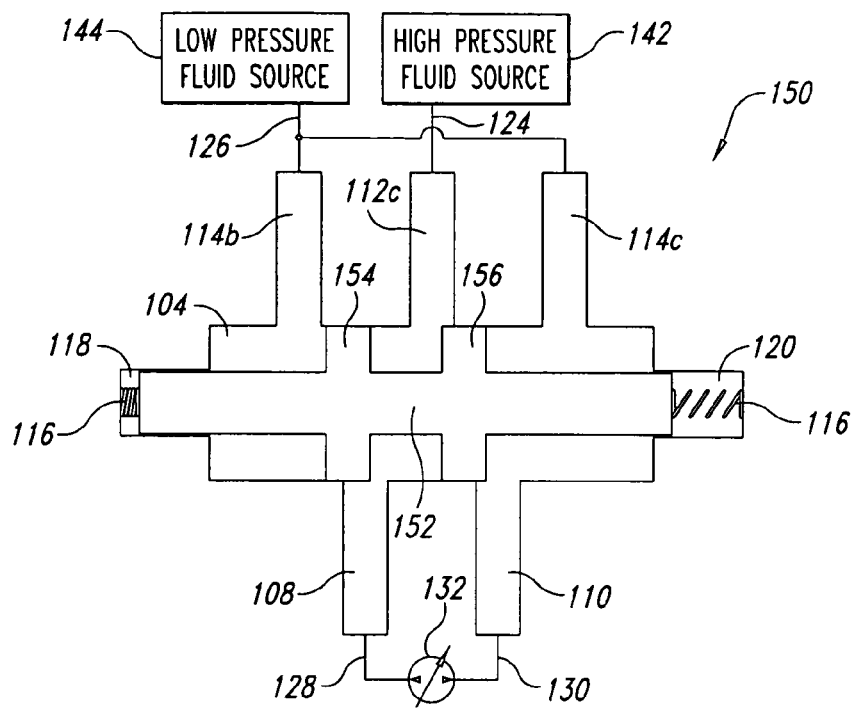
Figure 2C:
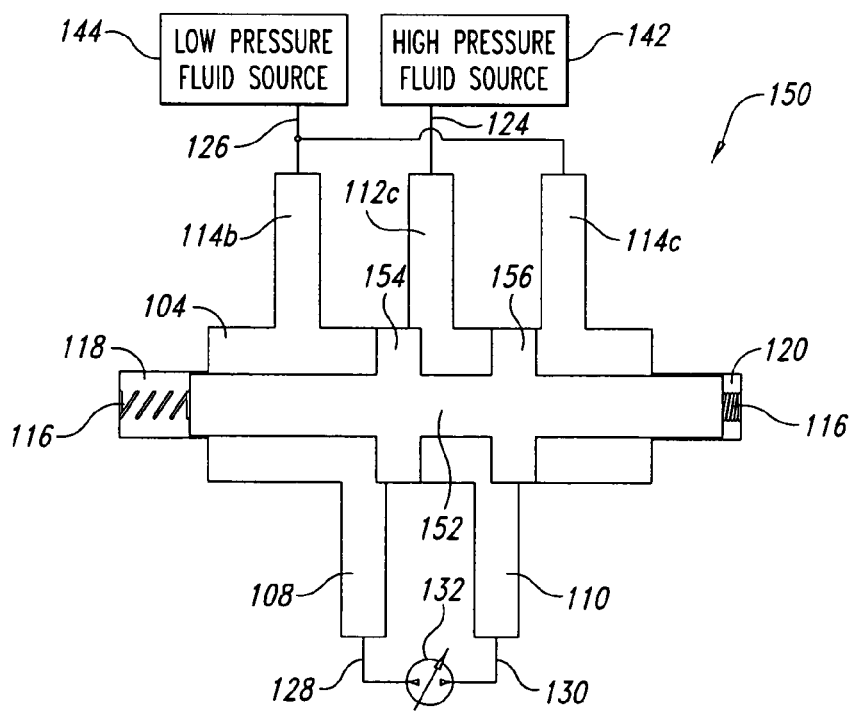
Figure 3:
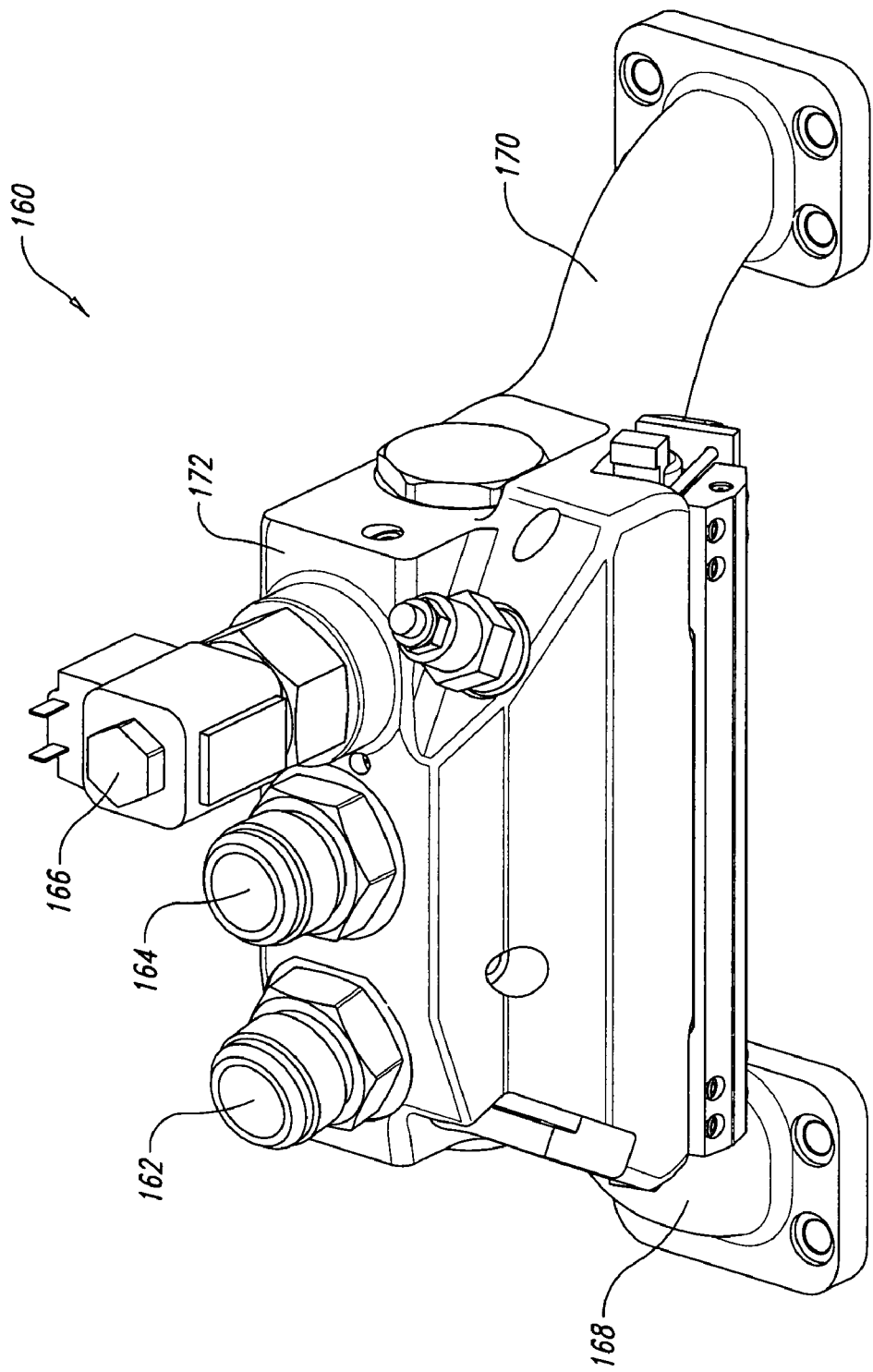
FIG. 3 shows, in perspective view, a spool valve assembly according to an embodiment of the invention.

FIGS. 2A–2C illustrate a spool valve 150 according to another embodiment of the invention. Spool valve 150 differs from spool valve 100 in that it includes a single high pressure inlet 112c and two low pressure inlets 114b, 114c. It may be seen, with reference to FIG. 2A, that when the spool 152, with first and second lands 154, 156, is in a first position, centered within the bore 104 of the spool 150, the first and second drive outlets 108, 110 are in fluid communication with the low pressure fluid source 144, and with each other, via the first low pressure inlet 114b, low pressure line 126, and the second low pressure inlet 114c.

With reference to FIG. 2B it may be seen that when the spool 152 is in a second position, to the left of center within the bore 104, the first drive outlet 108 is in fluid communication with the high pressure fluid source 142 via the high pressure inlet 112c and the high pressure line 124, while the second drive outlet 110 is in fluid communication with the low pressure fluid source 144 via the second low pressure inlet 114c and the low pressure line 126.

Referring now to FIG. 2C, it may be seen that when the spool 152 is in a third position, to the right of center within the bore 104, the first drive outlet 108 is in fluid communication with the low pressure fluid source via the first low pressure inlet 114b and the low pressure line 126, while the second drive outlet 110 is in fluid communication with the high pressure fluid source via the high pressure inlet 112c and the high pressure line 124.

It will be recognized that the spool valve 100 of FIGS. 1A–1C and spool valve 150 of FIGS. 2A–2C, while structurally different, are functionally identical, to the extent that each is configured to provide a reversible fluid source to a hydraulic device, and to place the respective first and second drive outlets 108, 110 in fluid communication with each other and with the low pressure fluid source when the spools 106, 152 are centered within the respective bores 104.

Referring now to FIGS. 3–7, a spool valve 160 is shown, according to another embodiment of the invention. The spool valve 160 includes a valve body 172, a high pressure inlet 162, a low pressure inlet 164, and first and second drive outlets 168, 170 configured to be coupled to input ports of a hydraulic pump/motor.

Figure 4:
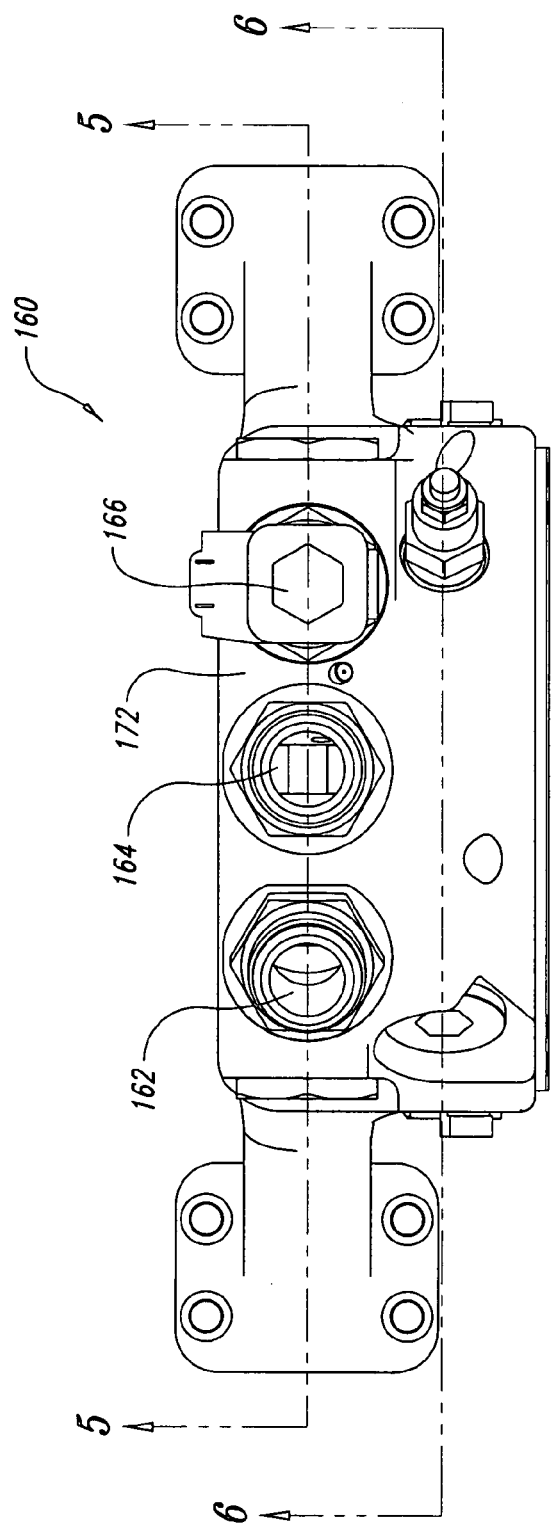
FIG. 4 shows the spool valve assembly of FIG. 3, in plan view.

FIG. 4 shows the spool valve 160 in plan view, and indicates the location of cross-sectional views of succeeding figures.

Figure 5A:
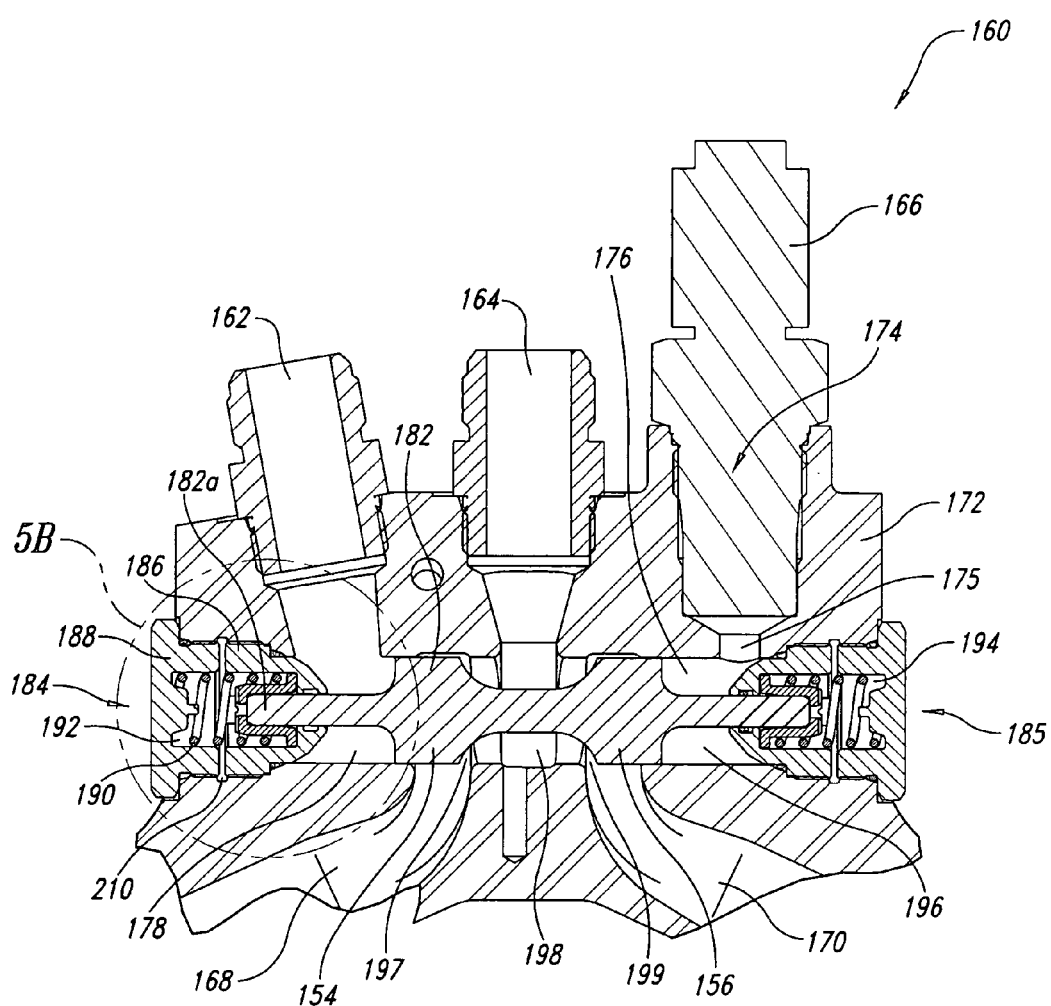
FIG. 5A shows the spool valve assembly of FIGS. 3 and 4 in cross section, taken at lines 5—5.

Referring now to FIG. 5A, a cross-section of the spool valve 160 is shown, taken along the lines 5—5 of FIG. 4. Spool valve 160 is structurally similar to the spool valve 100 illustrated diagrammatically in FIG. 1. The spool valve 160 includes first high pressure inlet 162, low-pressure inlet 164, and second high pressure inlet 174. The spool valve 160 also comprises first and second drive outlets 168, 170, longitudinal bore 176, and spool 182. The longitudinal bore 176 comprises high-pressure galleys 178, 196, low-pressure galley 198, and first and second supply annuli 197, 199. The spool 182 is further provided with first and second lands 154, 156.

The spool valve 160 is shown with the spool 182 in a central position within the longitudinal bore 176. As previously described with reference to spool valve 100 of FIG. 1, when the spool 182 of the spool valve 160 is centrally positioned, the first and second drive outlets 168, 170 are in fluid communication with each other and with the low-pressure fluid source via the low pressure inlet 164.

The spool 182 is configured to move quickly from one to another of three positions, depending on relative pressures provided at the first and second pilot chambers 192, 194. When pressure in each of the pilot chambers 192, 194 is equal, the return springs 190 exert force on opposing ends of the spool 182, causing the spool 182 to center within the bore 176. When pressure in pilot chamber 192 exceeds pressure in pilot chamber 194, the spool 182 moves to the right, resulting in a configuration similar to that described with reference to FIG. 1B. When pressure within the pilot chamber 194 exceeds pressure within the pilot chamber 192, the spool 182 moves to the left, as illustrated with reference to valve 100 in FIG. 1C. The mechanism for effective and dependable operation in the three positions described is provided by first and second end caps 184, 185, and will be described in greater detail with reference to FIG. 5B.

Figure 5B:
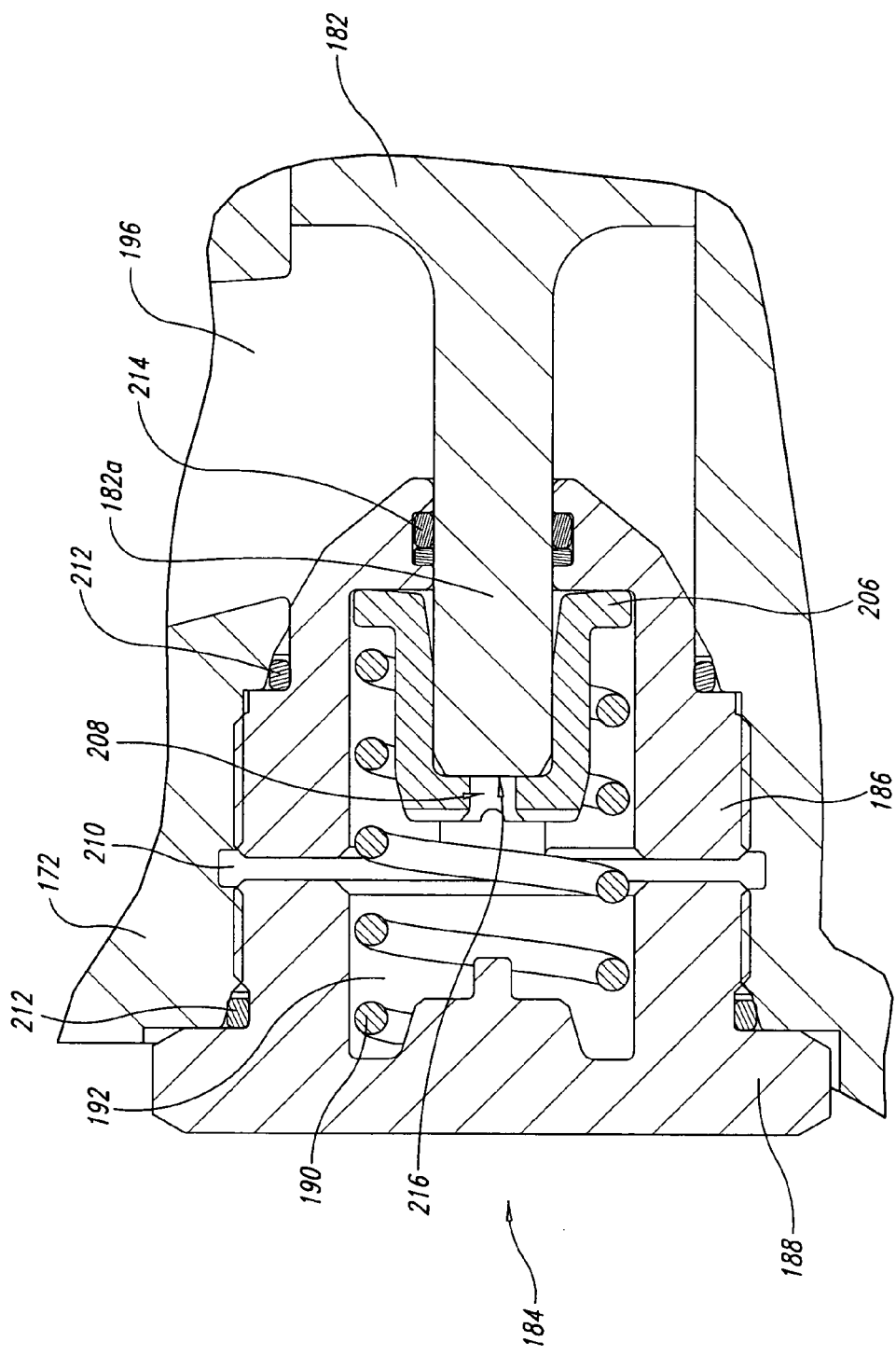
FIG. 5B shows a detail of the view of FIG. 5A.

FIG. 5B is a detail of the cross-section of spool valve 160 shown in FIG. 5A, indicated in FIG. 5A by reference numeral 5B. FIG. 5B shows the first end cap 184, including inner and outer end caps 186, 188, return spring 190, spring retainer 206, stem seal 214, and end cap seals 212. The spring retainer 206 is configured to receive a first stem end 182a of the spool 182, and to transfer a biasing force from the return spring 190 to the stem 182a. The stem seal 214 is configured to provide a slideable seal on the stem 182a, while the end cap seals 212 are configured to seal the pilot chamber 192 and to isolate the fluid in pilot chamber 192 from the fluid in the high-pressure galley 196. Pilot galley 210 is defined by a gap between the inner and outer end caps 186, 188, and is in fluid communication with a pilot valve (not shown) via a fluid passage formed in the valve body 172 (also not shown).

The second end cap 185 is substantially identical to the first end cap 184, and so will not be described separately.

In operation, the first and second end caps 184, 185 function as follows. When fluid pressure in pilot chamber 192 is equal to fluid pressure in pilot chamber 194, the return springs 190, bearing against spring retainers 206, drive the respective spring retainers 206 to make contact with a wall of the pilot chamber 192. The biasing force of the return springs 190 is transmitted to the stems 182a, 182b of the spool 182, centering the spool in the bore 176. When pressure in pilot chamber 192 exceeds pressure in pilot chamber 194, the superior pressure, acting on the stem face 216 of stem 182a pushes the spool 182 to the right. As the spool 182 moves to the right, the stem 182a separates from the spring retainer 206, and partially withdraws from the inner end cap 186. Spring retainer passage 208 permits fluid, acting on the surface 216 of the spool stem 182a, to transit the spring retainer 206. It will be noted that the return spring 190 does not decompress during this operation. Thus, when fluid pressures in pilot chambers 192, 194 are again balanced, the return spring 190 within the pilot chamber 194 is not obliged to compress the return spring 190 of pilot chamber 192 in order to return the spool to its central position.

On the other hand, when pressure in pilot chamber 194 exceeds pressure in pilot chamber 192 the spool 182 is driven to the left. When the spool 182 moves to the left, the stem 182a bears against the spring retainer 206, moving the spring retainer leftwardly within the pilot chamber 192, compressing the return spring 190. Again, when pressure within the pilot chambers 192, 194 is balanced, the return spring 190, bearing against the spring retainer 206, pushes the spool 182 back to the center position.

It will be noted that, because the return springs 190 are not permitted to decompress beyond the position corresponding to a centered spool, variations in relative tension of the two springs 190 will not result in the spool 182 being positioned incorrectly with respect to the center location in the bore 176.

Figure 7:
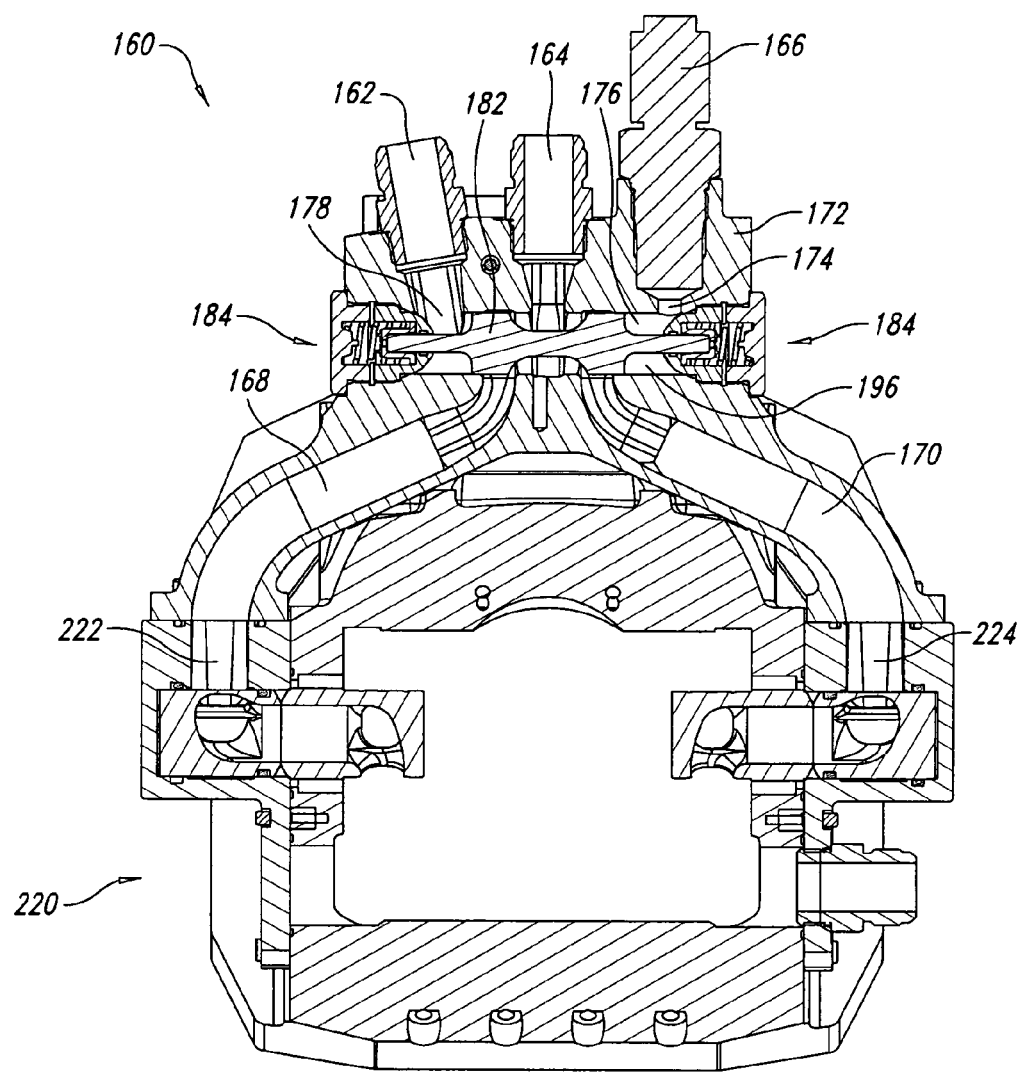
FIG. 7 is a cross sectional view of the spool valve assembly of FIGS. 3–6 coupled to a hydraulic pump/motor.

Referring now to FIG. 7, the spool valve 160 is shown affixed to a casing of a pump/motor 220. First and second drive outlets 168, 170 are coupled respectively to first and second pump/motor fluid input ports 222, 224. While the pump/motor 220 is not shown in detail, such devices are well known in the art. It will be understood that when the first pump/motor input 222 is in fluid communication with a high pressure fluid source, and the second pump/motor input 224 is in fluid communication with a low pressure fluid source the pump/motor will apply torque to a drive shaft in a first direction. Conversely, when the second pump/motor input 224 is in fluid communication with a high pressure source while the first pump/motor input 222 is in fluid communication with a low pressure source, the pump/motor will apply torque to the drive shaft in a second direction, opposite the first direction. Finally, when the first and second pump/motor inputs 222, 224 are in fluid communication with each other, or with a common fluid source of either high pressure or low pressure, the output shaft of the pump/motor 220 will operate in a neutral configuration, rotating freely with no applied torque.

The spool valve 160 includes a reverse valve 166 positioned in the second high pressure input 174. The operation of the reverse valve 166 will not be described in detail at this point, except to note that the reverse valve 166 is configured to provide limited high pressure fluid communication from a high pressure fluid source to the second high pressure galley 196.

It will be noted, with reference to FIGS. 5A and 7, that when the spool 182 travels from a first position to a second position, for example from a position to the right of center to a position to the left of center, the lands 154, 156 momentarily close the annuli 197, 199, respectively.

Assuming, for the purpose of this description, that the pump/motor is functioning as a motor, and that the spool 182 is positioned to the right of center in a configuration similar to that shown in FIG. 1B with reference to spool valve 100, high pressure fluid will be flowing from a high pressure fluid source to the high pressure input 162, where it will pass through the valve 160 to the drive outlet 168 and into the first pump/motor inlet port 222, driving the output shaft of the pump/motor in the first direction. Meanwhile, low-pressure fluid will be flowing from the second pump/motor port 224 into the second drive outlet 170, through the valve 160 to a low-pressure fluid source via the low-pressure inlet 164. As the spool 182 moves to the left toward the centered position, the first land 154 will cross over the first supply annulus 197, temporarily closing the first drive outlet 168.

Assuming that there is an inertial load coupled to the output shaft of the pump/motor 220, the output shaft will continue to rotate, creating a vacuum in the high pressure side of the pump/motor. Consequently, the pump/motor will cavitate briefly while the first drive outlet 168 is closed. This is not harmful to the pump/motor, and is of such short duration that it is virtually unnoticeable by an operator. As the spool 182 continues past the center position and toward the left position, described in detail with reference to spool valve 100 of FIG. 1C, the second land 156 of the spool 182 will cross over the second annulus 199, momentarily closing the second drive outlet 170.

As the pump/motor 220 continues to rotate due to the inertial load, fluid pressure in the low pressure side of the pump/motor 220, the second pump/motor input port 224, and the second drive outlet 170 will suddenly rise to an extreme level, due to the continued rotation of the output shaft and the closure of the second supply outlet 170, resulting in a brief but extremely high pressure shock to that side of the pump/motor system. Such a shock is capable of damaging the pump/motor or rupturing seals in supply lines and valves. To prevent such an occurrence a bypass check valve is provided.

Figure 6:
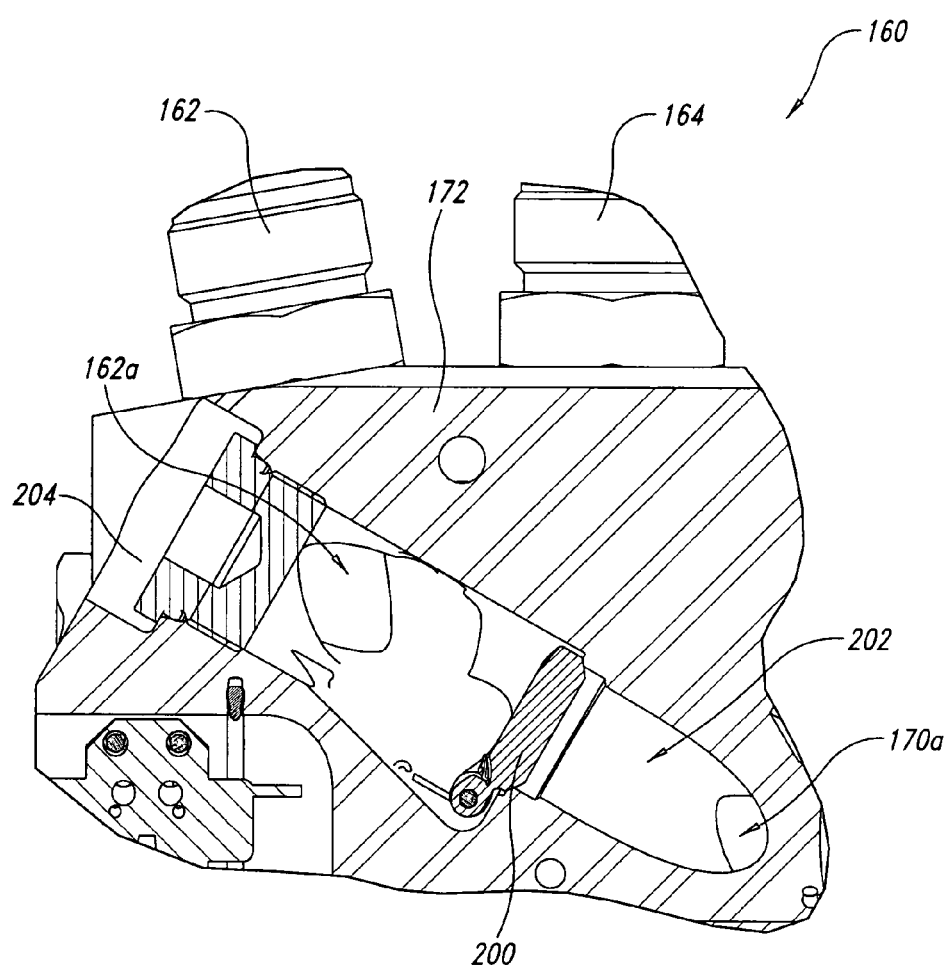
FIG. 6 shows the spool valve assembly of FIGS. 3 and 4 in cross section, taken at lines 6—6.

Referring now to FIG. 6, a cross-section is shown taken along lines 6—6 of FIG. 4. A backflow passage 202 is shown, formed in the valve body 172 and intersecting the high pressure inlet 162 at high pressure inlet passage 162*a*, and intersecting the second drive outlet 170 at drive outlet passage 170*a*. A bypass check valve, in the form of a flapper valve 200 permits passage of fluid from the second drive outlet 170, through the passage 170*a* to the first high pressure inlet 162, via the high pressure inlet passage 162*a*.

In operation, when the spool 182 moves from the right position or centered position to the left position while fluid is passing from the second drive outlet 170 to the low pressure inlet 164 via the spool valve 160, the second land 156 will momentarily close the second drive outlet 170. As the output shaft of the pump/motor 220 continues to rotate, fluid pressure within the second drive outlet 170 will rise until it exceeds the fluid pressure in the first high pressure input 162. As fluid pressure in the second drive outlet 170 achieves, and begins to surpass, the fluid pressure in the first high pressure inlet 162, the flapper valve 200 will open, permitting fluid from the second drive inlet to pass into the first high pressure inlet, and thence to the high pressure fluid source. This will prevent the occurrence of high pressure shock as previously described.

As noted previously, reverse valve 166 is positioned within the second high pressure inlet port 174, for the purpose of controlling flow of high pressure fluid through the second high pressure fluid port 174 into the high pressure galley 196.

For example, when the pump/motor 220 is used in a passenger vehicle, as described in the background section of the specification, the pump/motor may be advantageously used for regenerative braking. Assuming, for the purpose of this description, that rotation of the output shaft of the pump/motor 220 in the first direction, as previously described, corresponds to rotation of the wheels of the vehicle in a forward direction, the pump/motor 220 will be acting as a motor driving the vehicle forward when the spool 182 is in the right hand position, corresponding to the position shown in FIG. 1B with reference to spool valve 100. In this configuration, high pressure fluid passes into the spool 160 via first high pressure inlet 162 and into the first pump/motor input port 222 via the first drive outlet 168. Low pressure fluid passes from the pump/motor 220 to the low pressure fluid source 164, via the second pump/motor input port 224, the second drive outlet 170, and the low pressure fluid inlet 164.

When braking of the vehicle is required, the spool 182 is switched to the left of center position, resulting in the coupling of the first pump/motor input port 222 with the low pressure fluid source and the second pump/motor input port 224 with the high pressure fluid source via the second high pressure inlet 174. This reversal of the pressure differential supply to the pump/motor 220 causes a reverse torque to be applied to the output shaft of the pump/motor 220, slowing the vehicle. As the vehicle continues to travel forward in this mode, the pump/motor 220 operates as a pump, driving fluid at high pressure into the high pressure fluid source, via the second drive outlet 170, the high pressure galley 196 and the second high pressure inlet 174. As the vehicle slows to a stop, the output shaft of the pump/motor ceases to rotate. At this point, the high pressure on the opposite side of the pump/motor 220 will begin to drive the pump/motor in reverse. As high pressure fluid begins to flow into the second high pressure inlet 174, the reverse valve 166 closes to prevent the flow of high pressure fluid to the pump/motor 220 via the second high pressure inlet 174, preventing reverse travel of the vehicle during regenerative braking mode. While the reverse valve 166 may take any known form, in one embodiment, it includes a check valve.

When the vehicle is required to travel in reverse, the operator selects reverse operation, which activates the reverse valve 166. The reverse valve 166 is configured to override its own check valve when in reverse mode, permitting fluid to flow from the second high pressure inlet to the second drive outlet. It will be noted that the second high pressure inlet 174 communicates with the second high pressure galley 196 via a narrowed aperture 175. The narrowed aperture 175 limits the volume of fluid passing therethrough, thus preventing the operation of the vehicle at high speeds in reverse mode. If, when the pump/motor is operating in regenerative braking mode as previously described, the volume of high pressure fluid passing into the second drive outlet 170 exceeds the capacity of the aperture 175 and reverse valve 166, excess pressurized fluid passes easily through the backflow passage 202 to the first high pressure inlet 162, as previously described.

Figure 8:
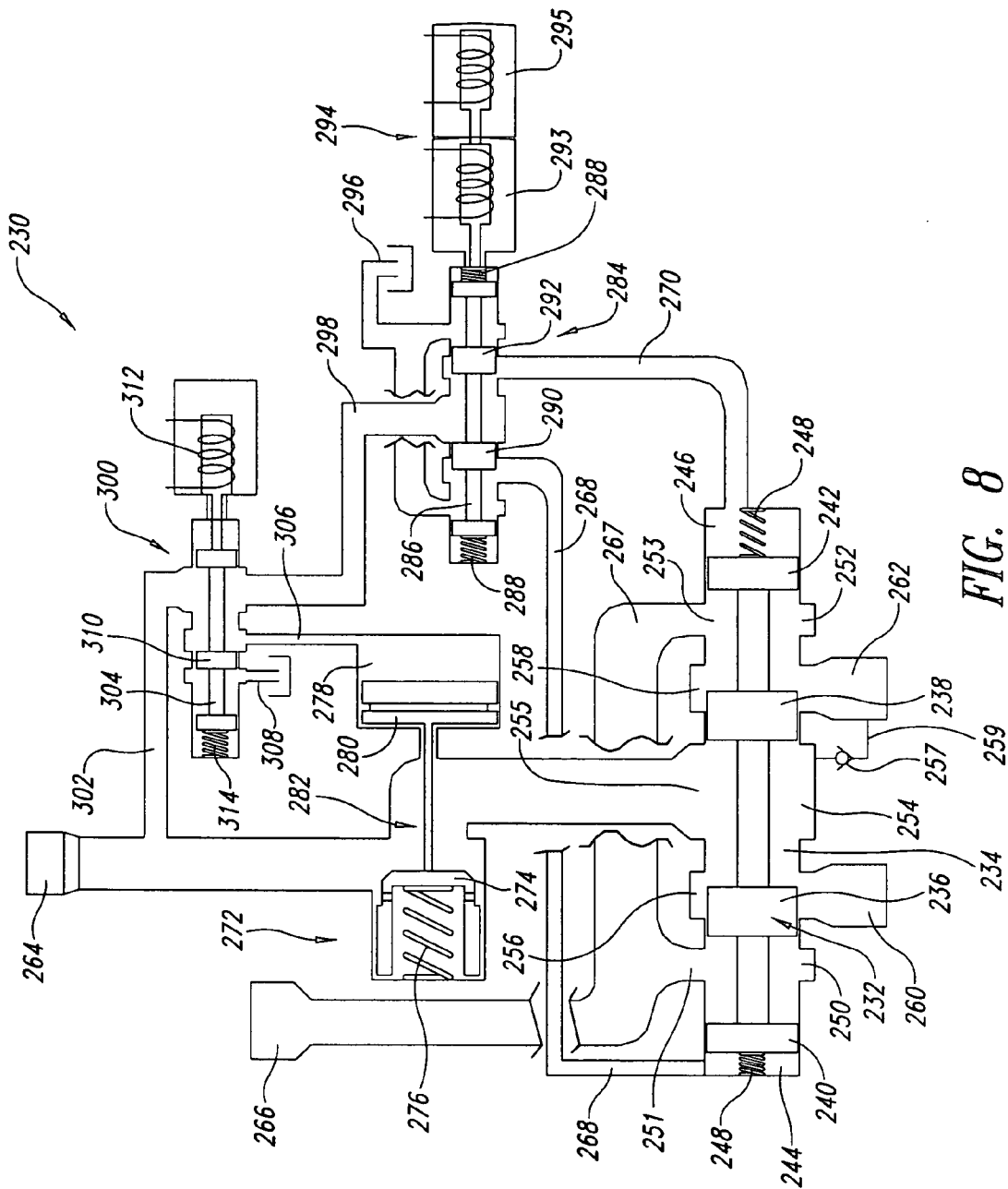
FIG. 8 shows, diagrammatically, a spool valve assembly according to another embodiment of the invention.

FIG. 8 illustrates a diagrammatical representation of a spool valve according to another embodiment of the invention. The spool valve 230 includes a main spool 232, configured to travel within the main bore 234. The main spool 232 includes first and second lands 236, 238, and first and second pilot pistons 240, 242. The main bore 234 includes first and second pilot chambers 244, 246, first and second low-pressure annuli 250, 252, and a high-pressure annulus 254. Return springs 248 are positioned within each of the first and second pilot chambers 244, 246. The main bore 234 also includes first and second drive outlet annuli 256, 258. First and second drive outlets 260, 262 are in fluid communication with first and second drive outlet annuli 256, 258, respectively.

The first and second low-pressure annuli 250, 252 are in fluid communication with a low-pressure inlet 266 via a low-pressure inlet manifold 267. The high-pressure annulus 254 is in fluid communication with the high-pressure supply 264 via an anti-reverse check valve 272. First and second pilot chamber supply lines 268, 270 provide fluid access to the first and second pilot chambers 244, 246. High- and low-pressure fluid supply to the pilot chamber supply lines 268, 270 is controlled by a pilot valve, indicated generally at 284.

The pilot valve 284 includes a pilot valve spool 286, having first and second lands 290, 292. The pilot valve 284 also includes return springs 288 and a pilot valve actuator 294. The pilot valve actuator includes first and second solenoids 293, 295. The first solenoid 293 is configured to drive the pilot valve spool 286 to the rightward position, as shown in FIG. 8, and the second solenoid is configured to drive the pilot valve spool 286 to the leftward position. Return springs 288 are configured to center the pilot valve spool 286 when the first and second solenoids 293, 295 are both de-energized. The pilot valve 284 is coupled to low- and high-pressure fluid sources via low-pressure supply 296 and high-pressure supply 298, respectively.

The anti-reverse check valve 272 includes an anti-reverse poppet 274, check valve return spring 276, check valve piston chamber 278, check valve piston 280, and high-pressure check passage 282. The anti-reverse check valve 272 is controlled by an anti-reverse pilot valve 300. The anti-reverse pilot valve 300 includes anti-reverse pilot spool 304 having a single land 310. The pilot valve 300 further includes a solenoid actuator 312, and a return spring 314. The anti-reverse pilot valve 300 is in fluid communication with the high- and low-pressure fluid sources via the high-pressure supply 302 and low-pressure supply 308, respectively.

A backflow passage 259 communicates between the second drive outlet 262 and the high-pressure annulus 254. A bypass check valve 257 is positioned in the passage 259 to control passage of fluid. These components function substantially identically to the backflow passage 202 and bypass check valve 200, as described with reference to FIG. 6.

The operation of the spool valve 230 will now be described, with reference to its use in controlling a pump/motor providing motive power for a passenger vehicle. For the purposes of this description, it will be assumed that, when the first drive outlet 260 is in fluid communication with a high-pressure fluid source, and the second drive outlet 262 is in fluid communication with a low-pressure fluid source, the associated pump/motor will apply torque at an output shaft coupled to drive wheels of the vehicle, such that the drive wheels are motivated to rotate in a forward direction. Given the stipulated configuration, the spool 232 of the spool valve 230 is pictured in FIG. 8 in a position to provide forward motivation to the vehicle. For forward operation, the first solenoid 293 is energized, driving the pilot spool 286 to the right, thereby coupling the second pilot chamber 246 with the high pressure fluid source via the second pilot chamber supply line 270 and the pilot valve high pressure supply 298.

It will be recognized that the spool valve 230 is functionally similar to the spool valve 150 of FIGS. 2A–2C, insofar that high-pressure fluid is supplied to the main bore 234 of the valve 230 between the first and second annuli 236, 238, while low-pressure fluid is supplied to the bore at either end of the main spool 232. With the spool 232 in the position shown in FIG. 8 (compare to the position of spool valve 150 as shown in FIG. 2B), it may be seen that high-pressure fluid entering via the high-pressure inlet 264 may pass freely through the check passage 282, into the bore 234 via the high-pressure annulus 254, and thence to the pump/motor of the vehicle via the first drive outlet 260. Low-pressure fluid from the pump/motor passes into the main bore 234 via the second drive outlet 262, and continues to the low-pressure source via the second low-pressure annulus 252, the low-pressure manifold 267 and the low-pressure inlet 266.

When the vehicle operator applies the brake, the first pilot valve solenoid 293 is deactivated, while the second pilot valve solenoid 295 and the anti-reverse pilot solenoid 312 actuate their respective valves. During normal forward operation of the vehicle, the pilot valve 284 is configured to couple the high-pressure fluid source to the second pilot chamber 246 via the second pilot chamber supply line 270, while coupling the first pilot chamber 244 to the low-pressure fluid source via the first pilot chamber supply line 268, resulting in the leftward positioning of the main spool 232, as shown in FIG. 8.

When solenoid 295 is activated, the spool 286 of the pilot valve 284 is driven to the left, thereby reversing the couplings of the first and second pilot chamber supply lines 268, 270. Accordingly, high-pressure fluid is coupled to the first pilot chamber supply line 268, while low-pressure fluid is coupled to the second pilot chamber supply line 270. With high-pressure fluid coupled to the first pilot chamber 244 and low-pressure fluid coupled to the second pilot chamber 246, the main spool 232 is driven to the right. In this position, as explained in detail with reference to valve 150 in FIG. 2C, the fluid couplings of first and second drive outlets 260, 262 are reversed, resulting in the high-pressure fluid source being coupled to the pump/motor via the second drive outlet 262 while the low-pressure fluid source is coupled to the pump/motor via first drive outlet 260. In this configuration, torque to the pump/motor is reversed, braking the vehicle. As the vehicle continues to roll forward, low-pressure fluid is drawn from the low-pressure fluid source via the first drive outlet 260, and fluid is driven at high pressure to the high-pressure fluid source, via the second drive outlet 262.

During normal forward operating conditions, the anti-reverse pilot solenoid 312 is active, which drives the anti-reverse pilot spool 304 to the left against return spring 314. In this position, the check valve piston chamber supply line 306 is coupled to the high-pressure fluid source via the anti-reverse pilot high-pressure supply 302. At the moment the operator applies the brake, the anti-reverse pilot solenoid 312 is deactivated, at which time the return spring 314 drives the spool 304 to the right. In this position, the check valve piston chamber supply line 306 is coupled to the low-pressure fluid source via the anti-reverse pilot low-pressure supply 308. With the check valve piston chamber 278 coupled to the low-pressure fluid source, the check valve return spring 276 is able to drive the anti-reverse poppet and the check valve piston 280 to the right, bringing the poppet 274 into contact with the high-pressure check passage 282. While the vehicle continues to roll in a forward direction, high-pressure fluid, passing into the valve 230 via the second drive outlet 262 is forced past the check valve 272 to the high-pressure fluid supply, via the check passage 282. However, when the vehicle comes to a stop the fluid pressure at the second drive outlet 262 will drop below the fluid pressure of the high-pressure fluid supply, permitting the anti-reverse poppet 274 to seat in the high-pressure check passage 282. The check valve 272 prevents passage of high-pressure fluid back into the pump/motor via the second drive outlet 262.

It will be recognized that, in order for the vehicle to travel in reverse, high-pressure fluid must be allowed to pass into the pump/motor via the second drive outlet 262. Thus, when the operator selects reverse mode, the second pilot valve solenoid 295 is activated, driving the pilot valve spool 286 to the left, as described with reference to the braking operation. However, in reverse mode, the anti-reverse pilot solenoid remains activated, holding the check valve 272 open. In this configuration, high pressure fluid is free to enter the pump/motor via the second drive outlet 262 and drive the pump/motor in the reverse direction, driving the vehicle rearward.

In the event that a malfunction causes a power loss to the pilot valve actuator 294, the return springs 288 are configured to center the pilot spool 286, thereby coupling the first and second pilot chamber supply lines 268, 270 to the low pressure fluid source. When the fluid pressure in the first and second pilot chambers is equal, as in this case, the return springs 248 center the main spool 232, placing the pump/motor in a free wheeling, or neutral condition.

Figure 9:
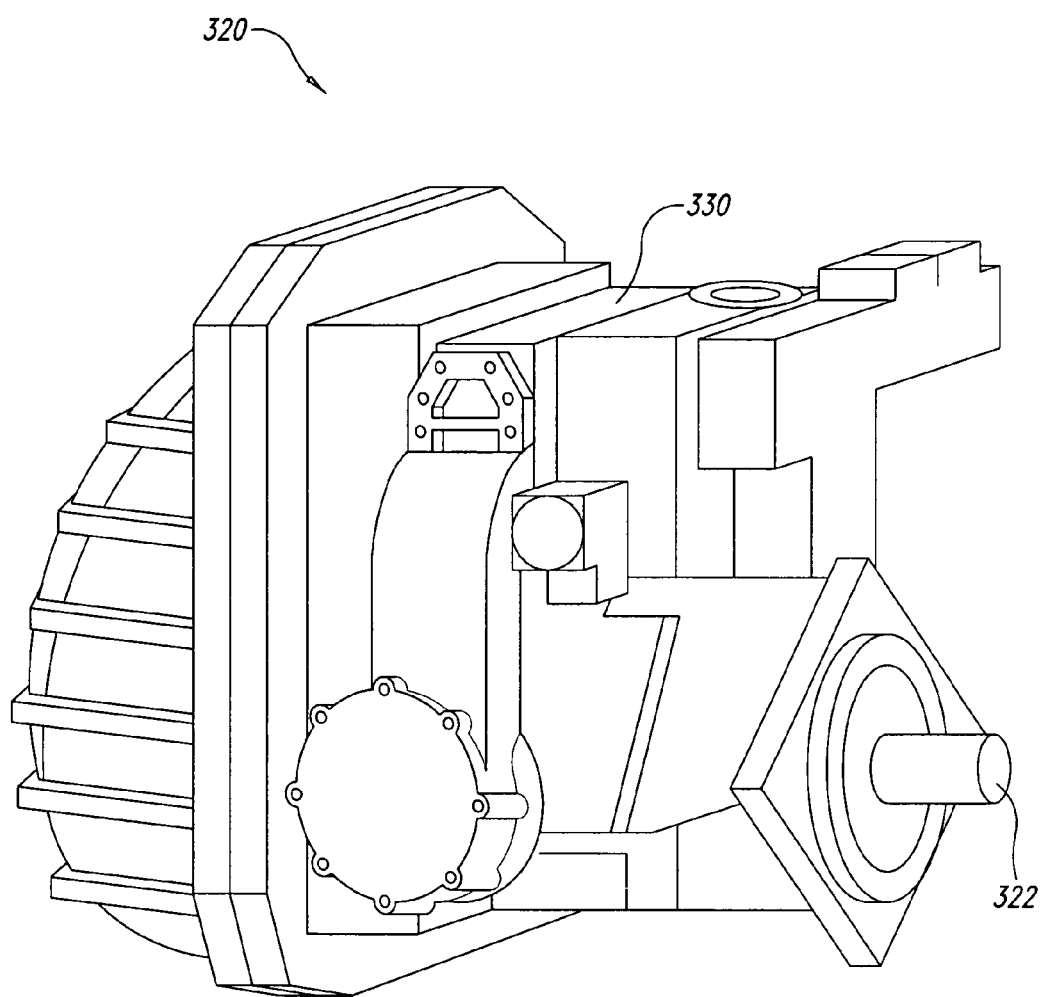
FIG. 9 is a perspective view of a pump/motor incorporating the spool valve assembly of FIG. 8.

FIGS. 9–13 illustrate a pump/motor 320 in general, and an integrated spool valve assembly 330 in detail. FIG. 9 shows the pump/motor 320 with an output shaft 322. Pump/motor 320 is configured to be mounted to a passenger vehicle, with the output shaft 322 coupled to the drivetrain thereof, for the purposes of providing motive power to the vehicle. The integrated spool valve assembly 330 is shown coupled to the pump/motor 320.

Figure 10:
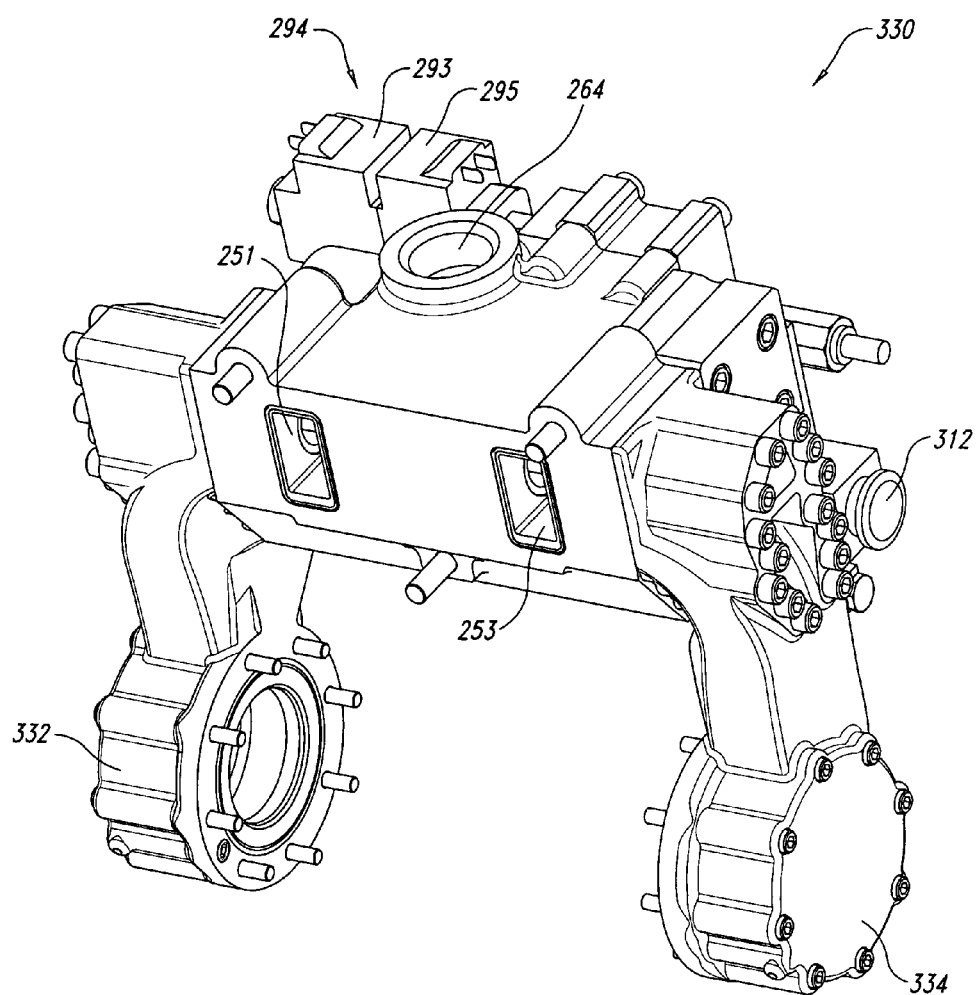
FIG. 10 is a perspective view of the spool valve assembly of FIG. 9.

FIG. 10 shows in more detail the integrated spool valve assembly 330. Functionally, the spool valve assembly 330 is substantially identical to spool valve 230, shown diagrammatically in FIG. 8. Where the features of integrated spool valve 230 are functionally identical to those described with reference to spool valve 230 of FIG. 8, they will be indicated with the same reference numeral. Only those features that are not described with referenced to FIG. 8 will be described in detail with reference to FIGS. 9–13.

Figure 11:
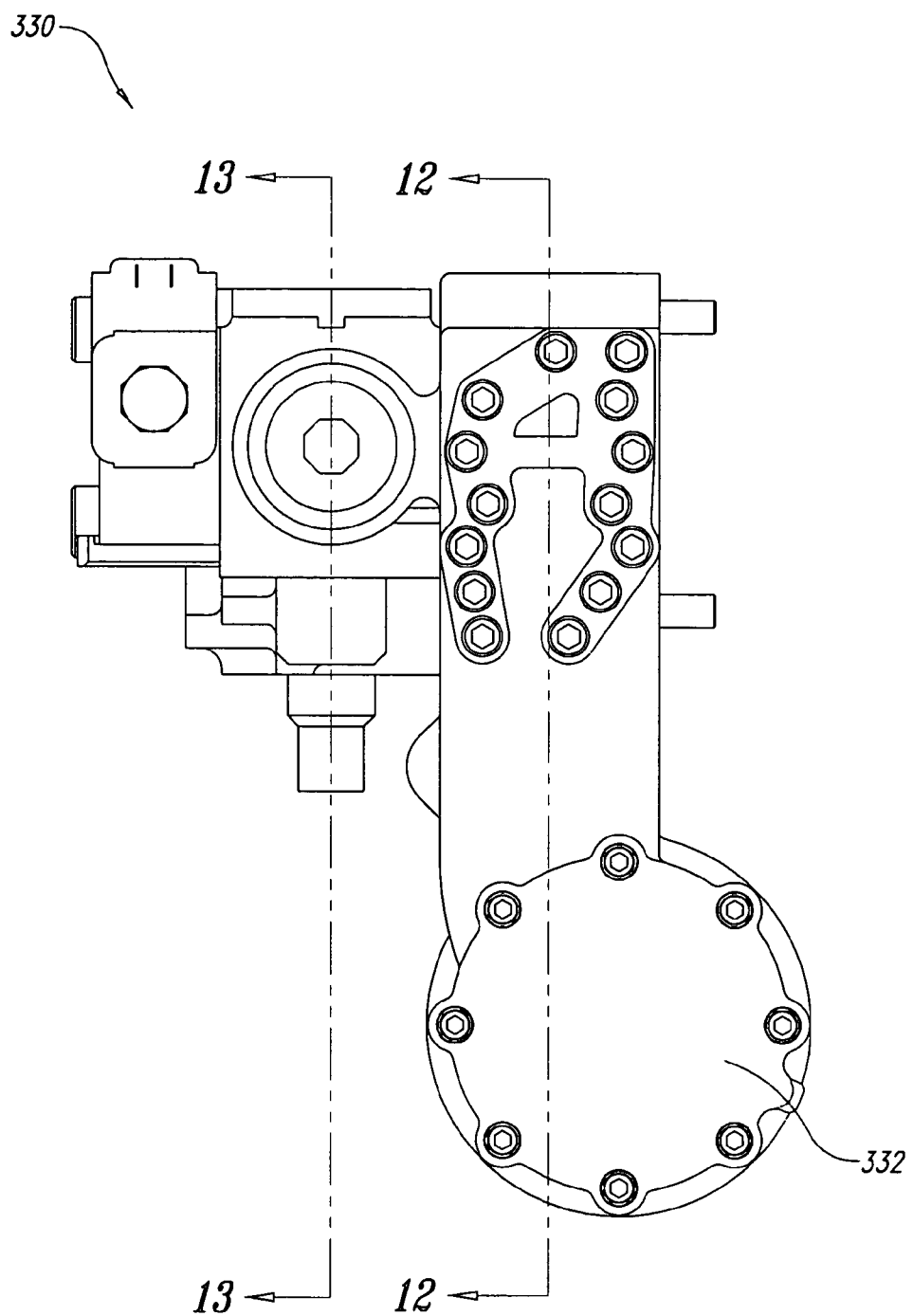
FIG. 11 is a side elevation of the spool valve assembly of FIGS. 9 and 10.
Figure 12:
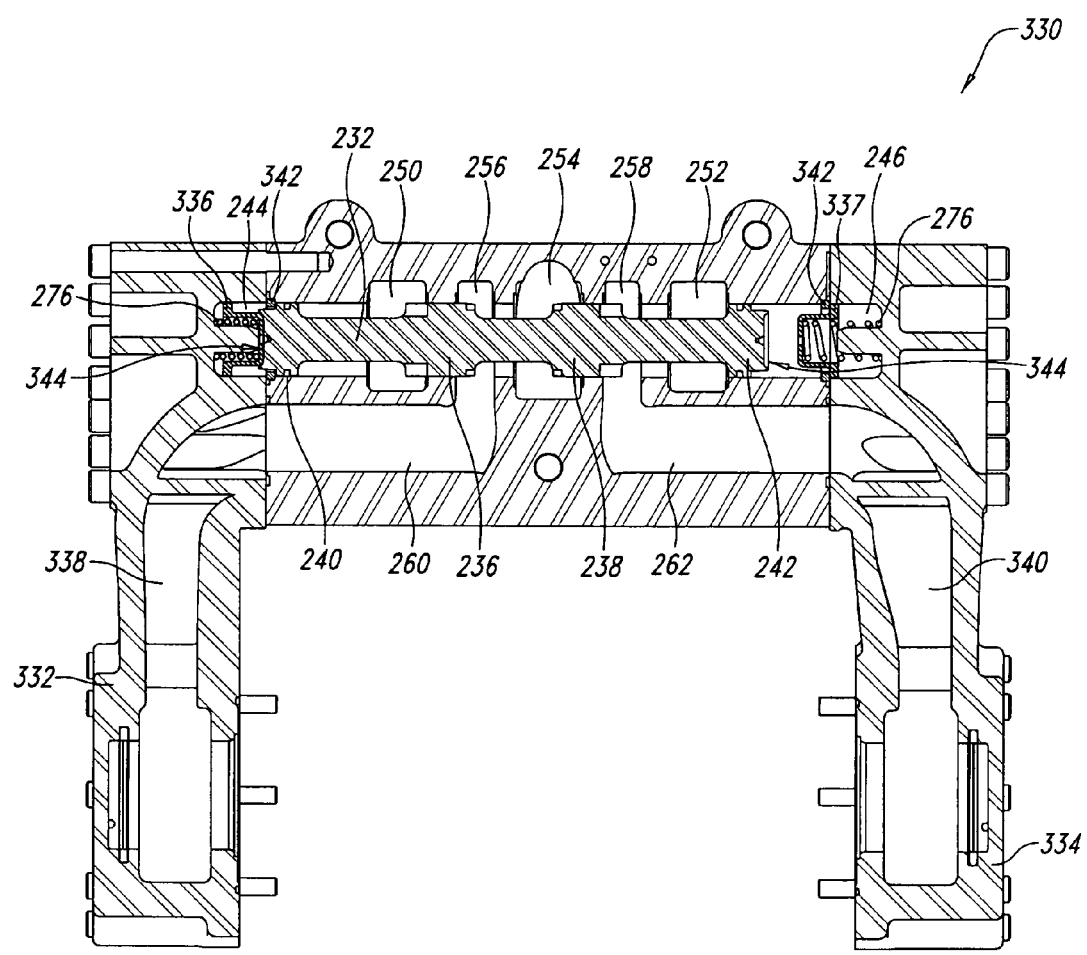
FIG. 12 shows the spool valve assembly of FIGS. 10 and 11 in cross section, taken at lines 12—12.
Figure 13:
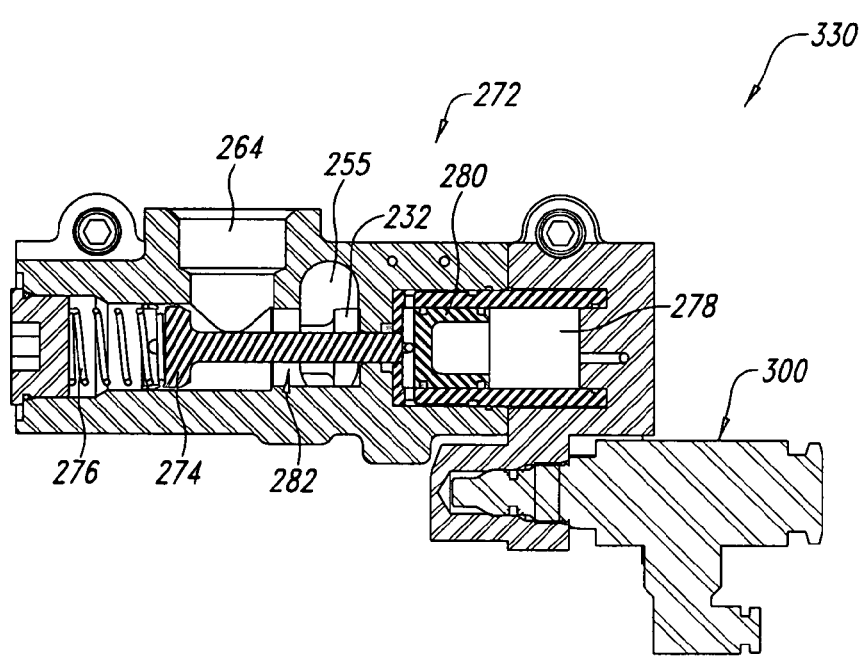
FIG. 13 shows the spool valve assembly of FIGS. 10 and 11 in cross section, taken at lines 13—13.

FIG. 11 shows a side elevation of the integrated spool valve 330 of FIG. 10, viewed from the left side. FIGS. 12 and 13 are cross-sectional views of the integrated spool valve 330, taken along the lines 12—12 and 13—13, respectively.

Referring now to FIG. 12, it may be seen that the integrated spool valve assembly 330 includes first and second return spring retainers 336, 337. The return spring retainers 336, 337 function in a manner similar to the spring retainers 206 of FIG. 5B. The retainers 336 are configured to transmit biasing force of the return springs 276 to end surfaces 344 of the main spool 232. Shoulders on the spring retainers 336 are configured to engage stop rings 342 to prevent travel of the respective spring retainer beyond a point corresponding to a centered position of the spool 232. Accordingly, as with the spool valve 160 of FIGS. 3–7, the return springs 276 are not permitted to extend beyond the point corresponding to a centered position of the spool, thereby permitting the spool to be properly centered when fluid pressure within first and second pilot chambers 244, 246 is equal. The main spool 232 of FIG. 12 is shown in a leftward position. It may be seen that the first return spring retainer 336 is moved back into the first pilot chamber 244, compressing the corresponding return spring 276. On the other hand, it may be seen that the second return spring retainer 337 is seated on the stop ring 343, and a gap is present between the corresponding end surface 344 of the main spool 232 and the second spring retainer 337.

FIG. 12 also shows first and second manifolds 332, 334 of the integrated spool valve assembly, which are configured to couple to fluid inputs of the pump/motor 320 for transmission of pressurized fluid from the spool valve to the pump/motor. First drive outlet 260 and second drive outlet 262 are coupled, respectively, to first manifold passage 338 and second manifold passage 340.

FIG. 13 shows in detail a cross-section of the integrated spool valve assembly 330 taken along the lines 13—13 of FIG. 11. Operation of check valve assembly 272 is described functionally above with reference to FIG. 8.

Figure 14:
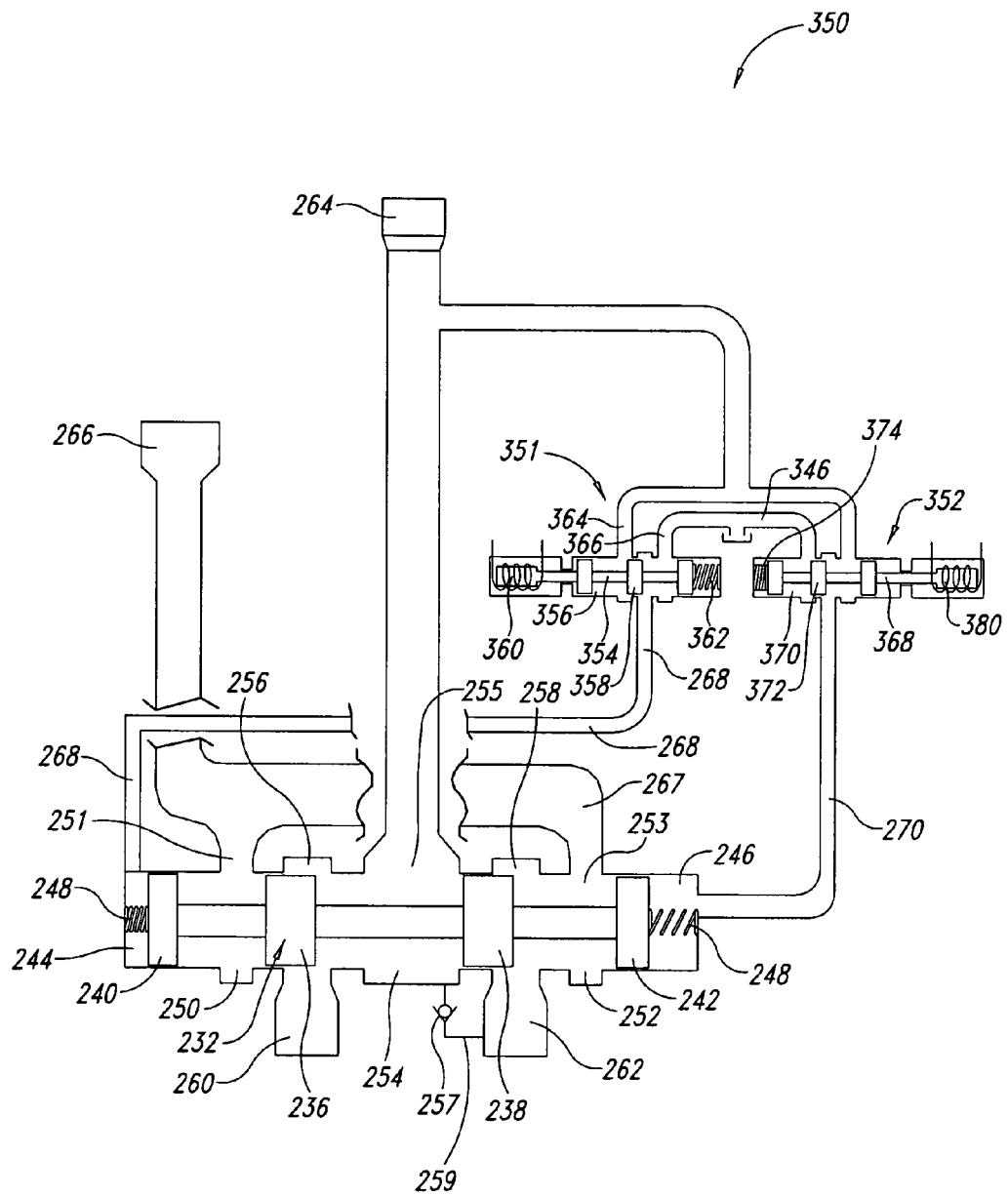
FIG. 14 shows, diagrammatically, a spool valve assembly according to another embodiment of the invention.

FIG. 14 illustrates a spool valve 350 according to another embodiment of the invention. The spool valve 350 has many features common with the spool valve 230 of FIG. 8. Such common features are indicated with the same reference numbers. Only those features not previously disclosed will be described in detail.

First and second pilot valves 351, 352 provide high- and low-pressure fluid to the first and second pilot chambers 244, 246, respectively. The first pilot valve 351 includes a spool 354 with a single land 358, a bore 356, and a return spring 362. High- and low-pressure fluid supply lines 364, 366 provide fluid to the valve, which is configured to selectively supply one or the other to the first pilot chamber 244 via the first pilot chamber supply line 268. A pilot solenoid 360 is configured to drive the spool 354 to the right when energized, compressing the return spring 362. In turn, the return spring 362 drives the spool 354 to the left when the solenoid 360 is de-energized.

The second pilot valve 352 includes a spool 368 with a single land 372, a bore 370, and a return spring 374. High- and low-pressure fluid supply lines 364, 366 provide fluid to the valve 352, which is configured to selectively supply one or the other to the second pilot chamber 246 via the second pilot chamber supply line 270. A pilot solenoid 380 is configured to drive the spool 368 to the left when energized, compressing the return spring 374. In turn, the return spring 374 drives the spool 368 to the right when the solenoid 380 is de-energized.

Each of the pilot valves 351, 352 is configured, when its respective solenoid 360, 380 is energized, to couple its respective pilot chamber 244, 246 with the high-pressure supply line 364 via its respective pilot chamber supply line 268, 270. Alternatively, when the solenoids 360, 380 are de-energized, the pilot valves 351, 352 are configured to couple their respective pilot chambers 244, 246 with the low-pressure supply line 366 via their respective pilot chamber supply lines 268, 270.

FIG. 14 shows the first pilot valve 351 in position to couple the first pilot chamber 244 with the low-pressure supply line 366, its solenoid 360 de-energized. The second pilot valve 352 is shown in position to couple the second pilot chamber 246 with the high-pressure supply line 364, its solenoid being energized.

An advantage of this configuration is that by employing separate pilot valves, a faster response may be obtained, inasmuch as each valve is a two-position valve, as compared to the pilot valve 284 of FIG. 8, which is a three-position valve. Thus, each of the valves 351, 352 has a shorter distance to travel between extremes than the single valve 284.

It will be recognized that, as with the valve 284, a loss of power to the solenoids will result in both valves switching their respective pilot chambers to the low-pressure supply, centering the main spool 232, thereby placing the associated pump/motor in neutral mode.

Figure 15:
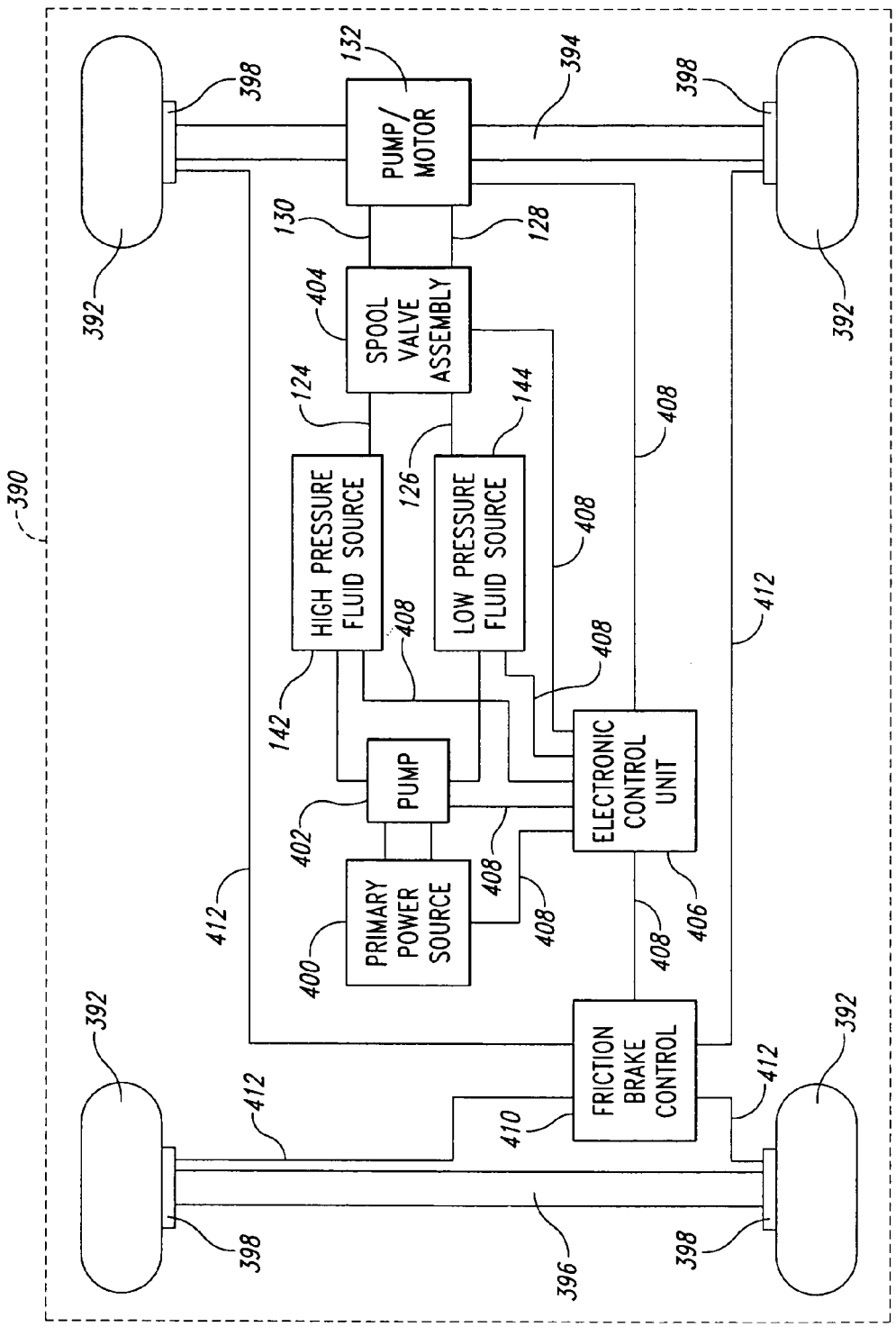
FIG. 15 shows, diagrammatically, a vehicle according to another embodiment of the invention.

FIG. 15 shows, in diagrammatic form, an embodiment of the invention comprising a vehicle 390. The vehicle 390 is shown having four wheels 392, although vehicles of different sizes and types fall within the scope of the invention. For example, vehicle 390 may be a passenger vehicle, a cargo vehicle, or some other vehicle used in an industrial application. Thus, the embodiment is not limited to four wheels. Additionally, the vehicle 390 may incorporate fewer wheels, such as for a motorcycle.

The vehicle depicted in FIG. 15 includes first and second axles 394, 396, each having two wheels 392 affixed thereon. It will be understood that this is merely representational, inasmuch as, in an actual application, there may be included a differential, a transaxle, steering apparatus, constant velocity joints, or other devices, and thus the depiction of solid axles 394, 396 is merely illustrative.

Friction brakes 398 are provided for each of the wheels, and are controlled by the friction brake control 410, which is coupled to each of the friction brakes 398 via brake lines 412. The friction brake control may include a hydraulic master cylinder, or some other means for controlling the application of the friction brakes 398.

The vehicle 390 includes a primary power source 400, which may be an internal combustion engine or some other device for converting chemical or electrical energy into mechanical energy. A hydraulic pump 402 is coupled to the primary power source 400, such that mechanical power from the primary power source 400 is used to draw fluid from the low-pressure fluid source 144 and to pump that fluid at high pressure to the high-pressure fluid source 142. The high- and low-pressure fluid sources 142, 144 are depicted generally, but may be hydraulic accumulators, as are known in the art. The high- and low-pressure fluid sources 142, 144 are coupled to a spool valve assembly 404, via high- and low-pressure fluid lines 124, 126, respectively.

The spool valve assembly 404 may be any of the spool valves or spool valve assemblies previously described with respect to other embodiments of the invention. Additionally, the spool valve assembly 404 may incorporate features from various ones of the previously described embodiments. The spool valve assembly 404 is coupled to a pump/motor 132 via first and second pump/motor lines 128, 130. The pump/motor 132 is coupled to the first axle 394, such that torque produced at an output shaft of the pump/motor (not shown) is transmitted to the axle 394 for the purpose of providing motive power to the vehicle 390. An electronic control unit 406 is coupled to various components of the vehicle 390 for the purpose of monitoring and controlling their operation. The electronic control unit is coupled via control lines 408, which are shown generically. However, it will be recognized that the control lines 408 may include individual lines configured to provide information to the electronic control unit 406 from the various components, such as speed, pressure, pump angle, temperature, etc. Additionally, the control lines 408 may include individual lines for transmitting control signals from the electronic control unit 406 to the respective components for the purpose of managing and controlling the operation of the vehicle 390.

While the vehicle 390 is shown in a configuration commonly referred to as a series hybrid configuration, in which the primary power source 400 provides power only to the hydraulic drive system, it will be recognized that the vehicle 390 may also be configured as a parallel hybrid configuration, in which the primary power source 400 is also coupled mechanically to a separate drive train of the vehicle, and thus provides direct motive power to the vehicle, as well as indirect power via the system depicted in FIG. 15.

According to another embodiment, the primary power source is coupled only to a drive train of the vehicle, and the hydraulic system draws energy from the rotation of the first axle 394 for the purpose of pressurizing the high-pressure fluid source 142, in a manner similar to that described with reference to regenerative braking. According to this embodiment, the electronic control unit 406 is configured to engage the pump/motor 132 for the purpose of pressurizing the high-pressure fluid source 142 during periods when the vehicle 390 requires less than the maximum efficient power output (or other desired power output level) of the primary power source 400, thus utilizing the excess efficiently provided capabilities of the primary power source 400. It will also be recognized that there are other configurations that may be applied in arranging the various components of vehicle 390, which are also within the scope of the invention.

In operation, according to an embodiment of the invention, the electronic control unit 406 is configured to monitor the pressure of the high-pressure unit 142, and to adjust the output of the primary power source 400 to provide sufficient energy to the pump 402 to maintain the pressure in the high-pressure fluid source at an optimum level.

When an operator of the vehicle places the vehicle in a forward mode of operation and steps on an accelerator, or otherwise demands acceleration, the electronic control unit switches the spool valve 404 to a forward control configuration, as previously described, and adjusts the pump angle of the pump/motor 132 according to the demand of the operator. When the vehicle arrives at a desired speed, and the operator removes pressure from the accelerator, the electronic control unit may switch the spool valve assembly to a neutral position, such as that depicted in FIGS. 1A and 2A. In this position, the pump/motor 132 no longer receives differentially pressurized fluid, and thus operates in a neutral mode. The electronic control unit may also destroke the pump/motor to a zero angle of displacement, to further reduce drag on the vehicle. With the spool valve assembly in the neutral position, the spool valve is able to quickly respond either to a braking demand or an acceleration demand from the operator of the vehicle.

When the operator demands a braking action, the electronic control unit 406 immediately switches the spool valve assembly 404 to regenerative mode, and increases the angle of the pump/motor 132 according to the demand of the operator. Thus, if the operator applies light pressure to a brake, the spool valve assembly is immediately switched to regenerative mode and the pump/motor 132 is moved to a relatively small angle of displacement, applying a modest drag on the first axle 394, providing a gradual slowing of the vehicle, and storing the energy reclaimed in the form of pressurized fluid. On the other hand, if the operator applies greater pressure to the brake, the spool valve assembly 404 is instantly switched to regenerative mode, and the pump/motor 132 is moved to a greater angle of displacement, which places a much greater drag on the first axle 394, and draws more energy from the forward motion of the vehicle, storing that energy in the form of pressurized fluid at the high-pressure fluid source 142.

The electronic control unit 406 may also be configured to engage the friction brakes 398 under certain conditions. These conditions may include a situation where the operator demands maximum braking, in which case the friction brake control 410 is used to engage all four wheels in the braking process. Other conditions under which the friction brakes may be applied include braking at very low speeds, and braking after detection of malfunctions in the spool valve assembly or the pump/motor. Additionally, the friction brakes may be applied in a situation where the high-pressure fluid source is fully pressurized and has no further capacity to receive pressurized fluid.

The electronic control unit 406 of the embodiment of FIG. 15 has been described as controlling all the operations of the vehicle 390. Nevertheless, according to some embodiments of the invention, many of these functions may be provided through other means, such as mechanical or hydraulic linkages and feedback. Such variations are within the abilities of one of ordinary skill in the art.

While the invention has been described with respect to various embodiments, it will be recognized that features of one embodiment may be combined with those of another embodiment to form a device or system that is not specifically described in detail herein. Such combinations are considered to fall within the scope of the invention. Additionally, it will be clear that some of the components included in the descriptions of the various embodiments of the invention may be replaced by components that are structurally different, but functionally identical to the described component. Such substitutions are also considered to fall within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A valve, comprising:
   a valve body having first and second input ports and first and second output ports;
   a valve bore positioned within the valve body;
   a spool positioned within the bore;
   means for establishing fluid communication between the first and second input ports and the first and second output ports, respectively;
   means for establishing fluid communication between the first and second input ports and the second and first output ports, respectively;
   means for establishing fluid communication between the second input port and the first and second output ports, simultaneously; and
   means for admitting one-way passage of fluid from the second output port to the first input port, regardless of a position of the spool.

2. The valve of claim 1 wherein the spool is configured to return to a centered position within the bore when at rest.

3. The valve of claim 1, further comprising first and second pilot chambers at first and second ends of the bore, respectively, the first and second pilot chambers configured to receive differentially pressurized fluid for moving the spool from a centered position to a rightward or leftward position.

4. The valve of claim 3, further comprising a pilot valve in fluid communication with the first and second pilot chambers and configured to selectively couple the first and second pilot chambers with a high- or low-pressure fluid source.

5. The valve of claim 4, further comprising a solenoid configured to actuate the pilot valve.

6. The valve of claim 3, further comprising first and second pilot valves in fluid communication with the first and second pilot chambers, respectively, each configured to selectively couple the respective pilot chamber with a high- or low-pressure fluid source.

7. The valve of claim 1, further comprising first, second, and third input annuli positioned in a leftward, a central, and a rightward region of the bore, respectively, and wherein the first input port is in fluid communication with the second annulus of the bore and the second input port is in fluid communication with the first and third annuli.

8. The valve of claim 1 wherein the means for admitting comprises a check valve formed in the valve body between the second output port and the first input port.

9. A valve, comprising:
   a valve body having first and second input ports and first and second output ports;
   a valve bore positioned within the valve body;
   a spool positioned within the bore;
   means for establishing fluid communication between the first and second input ports and the first and second output ports, respectively;
   means for establishing fluid communication between the first and second input ports and the second and first output ports, respectively;
   means for establishing fluid communication between the second input port and the first and second output ports, simultaneously; and
   means for preventing fluid from flowing outward from the valve via the second output port.

10. The valve of claim 9, further comprising means for selectively bypassing the preventing means.

11. A system, comprising:
    a hydraulic motor having first and second input ports, configured to apply torque to an output shaft of the motor in a first direction when a fluid pressure at the first input port exceeds a fluid pressure at the second input port, and configured to apply torque to the output shaft in a second direction when the fluid pressure at the second input port exceeds the fluid pressure at the first input port;
    a spool valve having first and second output ports coupled to the first and second input ports, respectively, and a high-pressure input port and a low-pressure input port, the valve configured to selectively couple the high-pressure and low-pressure input ports to the first and second input ports, respectively, or to the second and first input ports, respectively, according to a selected position of a spool of the valve; and
    a check valve positioned and configured to prevent fluid flow into the hydraulic motor from the second input port at least while the high-pressure input port is coupled to the second input port.

12. The system of claim 11, further comprising means for overriding the check valve.

13. The system of claim 11, further comprising a check valve configured to permit fluid passage from the second input port to the high-pressure input port.

14. The system of claim 11 wherein the motor is configured to operate as a pump when the motor is caused to rotate in opposition to torque at the output shaft.

15. The system of claim 11, further comprising a high-pressure fluid source coupled to the high-pressure input port.

16. The system of claim 15 wherein the high-pressure fluid source is a high-pressure accumulator.

17. The system of claim 15, further comprising a hydraulic pump having a high-pressure output coupled to the high-pressure fluid source.

18. The system of claim 17, further comprising an additional motor coupled to the hydraulic pump.

19. The system of claim 18 wherein the additional motor is powered by internal combustion.

20. The system of claim 11, further comprising a vehicle having a plurality of wheels coupled to a drive train, and wherein the output shaft of the hydraulic motor is coupled to the drive train of the vehicle.

21. A valve for controlling a hydraulic device, comprising:
a valve body having an interior bore;
a first valve port configured to be coupled to a fluid source pressurized to a first pressure range;
a second valve port configured to be coupled to a fluid source pressurized to a second pressure range, lower than the first pressure range;
an output port configured to carry fluid to a hydraulic device;
an input port configured to receive fluid from the hydraulic device;
a valve spool axially movable within the bore and configured to selectively channel fluid from the first and second valve ports to the output and input ports, respectively, while in a first position, from the second valve port to both the output and input ports while in a second position, and from the second and first valve ports to the output and input ports respectively, while in a third position; and
a check valve configured to permit one-way fluid passage from the input port to the first valve port.

22. The valve of claim 21, further comprising an anti-reverse check valve configured to prevent fluid from flowing into the valve via the output port.

23. The valve of claim 22 wherein the anti-reverse check valve comprises a bypass mechanism configured to override the anti-reverse check valve such that, when the mechanism is activated, fluid may flow into the valve via the output port.

24. The valve of claim 21, further comprising first and second hydraulic pilot chambers defined by first and second extreme ends of the bore, respectively, and by first and second ends of the spool, respectively, the first and second pilot chambers configured to receive pressurized fluid to act on the first and second ends of the spool, respectively.

25. The valve of claim 24 wherein the spool is configured to move to the first position in the event that a fluid pressure in the first pilot chamber exceeds a fluid pressure in the second pilot chamber, to move to the third position in the event that the fluid pressure in the second pilot chamber exceeds the fluid pressure in the first pilot chamber, and to move to the second position in the event that the fluid pressure in the first pilot chamber is substantially equal to the fluid pressure in the second pilot chamber.

26. The valve of claim 24 wherein a surface area of an end face of each of the first and second ends of the spool is less than a transverse sectional area of the bore.

27. A method of operating a hydraulic pump/motor, comprising:
placing a spool of a spool valve in a first position, such that a first fluid port of the pump/motor is in fluid communication with a first pressurized fluid source and a second fluid port of the pump/motor is in fluid communication with a second pressurized fluid source, and such that a torque in a first direction is applied to an output shaft of the pump/motor;
placing the spool in a second position, such that the first and second fluid ports of the pump/motor are in fluid communication with each other and with the second pressurized fluid source, and such that substantially no torque is applied to the output shaft;
placing the spool in a third position, such that the first fluid port of the pump/motor is in fluid communication with the second pressurized fluid source and the second fluid port of the pump/motor is in fluid communication with the first pressurized fluid source, and such that a torque in a second direction is applied to the output shaft of the pump/motor; and
preventing, while the spool is in the third position, the output shaft of the pump/motor from rotating in the second direction.

28. The method of claim 27, further comprising permitting a one-way flow of fluid from the second fluid port of the pump/motor to the first pressurized fluid source, without regard to the position of the spool.

29. The method of claim 27, further comprising moving the spool to the second position if a malfunction of the pump/motor or spool valve is detected.

30. A system, comprising:
a hydraulic motor having first and second input ports, configured to apply torque to an output shaft of the motor in a first direction when a fluid pressure at the first input port exceeds a fluid pressure at the second input port, and configured to apply torque to the output shaft in a second direction when the fluid pressure at the second input port exceeds the fluid pressure at the first input port;
a spool valve having first and second output ports coupled to the first and second input ports, respectively, and a high-pressure input port and a low-pressure input port, the valve configured to selectively couple the high-pressure and low-pressure input ports to the first and second input ports, respectively, or to the second and first input ports, respectively, according to a selected position of a spool of the valve; and
a check valve configured to permit fluid passage from the second input port to the high-pressure input port, regardless of a position of the spool.

* * * * *